United States Patent
Okumura et al.

(10) Patent No.: US 10,584,251 B2
(45) Date of Patent: Mar. 10, 2020

(54) FLAME RETARDANT COATING AGENT FOR VEHICLE SEAT, AND MANUFACTURING METHOD FOR FLAME RETARDANT VEHICLE SEAT MATERIAL

(71) Applicant: NICCA CHEMICAL CO. LTD., Fukui-shi, Fukui (JP)

(72) Inventors: Katuya Okumura, Fukui (JP); Shinichi Morinaga, Fukui (JP)

(73) Assignee: NICCA CHEMICAL CO., LTD., Fukui-shi, Fukui (JP)

( * ) Notice: Subject to any disclaimer, the term of this patent is extended or adjusted under 35 U.S.C. 154(b) by 0 days.

(21) Appl. No.: 15/994,439

(22) Filed: May 31, 2018

(65) Prior Publication Data

US 2018/0273771 A1    Sep. 27, 2018

Related U.S. Application Data

(62) Division of application No. 15/106,383, filed as application No. PCT/JP2014/083778 on Dec. 19, 2014.

(30) Foreign Application Priority Data

Dec. 20, 2013  (JP) ................................. 2013-264561

(51) Int. Cl.
| | |
|---|---|
| *C09D 5/18* | (2006.01) |
| *C09D 175/04* | (2006.01) |
| *C09D 201/00* | (2006.01) |
| *C08G 18/66* | (2006.01) |
| *C08G 18/75* | (2006.01) |
| *C08G 18/08* | (2006.01) |
| *C08G 18/32* | (2006.01) |
| *C08G 18/44* | (2006.01) |
| *C09D 7/61* | (2018.01) |
| *C09D 7/48* | (2018.01) |
| *C08J 7/04* | (2020.01) |
| *C08G 18/34* | (2006.01) |
| *C08G 18/65* | (2006.01) |
| *C08L 75/04* | (2006.01) |
| *C08K 5/3492* | (2006.01) |
| *C08K 5/521* | (2006.01) |
| *C08K 3/22* | (2006.01) |
| *C08K 3/32* | (2006.01) |

(52) U.S. Cl.
CPC ........... *C09D 5/18* (2013.01); *C08G 18/0823* (2013.01); *C08G 18/3203* (2013.01); *C08G 18/3206* (2013.01); *C08G 18/34* (2013.01); *C08G 18/44* (2013.01); *C08G 18/6511* (2013.01); *C08G 18/6541* (2013.01); *C08G 18/6659* (2013.01); *C08G 18/755* (2013.01); *C08J 7/047* (2013.01); *C08L 75/04* (2013.01); *C09D 7/48* (2018.01); *C09D 7/61* (2018.01); *C09D 175/04* (2013.01); *C09D 201/00* (2013.01); *C08G 2150/00* (2013.01); *C08J 2475/04* (2013.01); *C08K 5/34924* (2013.01); *C08K 5/521* (2013.01); *C08K 2003/2227* (2013.01); *C08K 2003/323* (2013.01); *C08L 2201/02* (2013.01); *C08L 2207/04* (2013.01)

(58) Field of Classification Search
CPC ...... C09D 5/18; C09D 7/1241; C09D 7/1216; C09D 175/04; C09D 201/00; C08L 75/04; C08L 2201/02; C08L 2207/04; C08G 18/6541; C08G 18/34; C08G 18/6511; C08G 18/3206; C08G 18/3203; C08G 18/755; C08G 18/0823; C08G 18/6659; C08G 18/44; C08K 2003/2227; C08K 2003/323; C08K 5/34924; C08K 5/521

See application file for complete search history.

(56) References Cited

U.S. PATENT DOCUMENTS

| | | | |
|---|---|---|---|
| 2004/0002559 A1* | 1/2004 | Troutman | C09D 5/185 524/100 |
| 2007/0259582 A1 | 11/2007 | Kohei | |
| 2009/0215932 A1 | 8/2009 | Fukuzumi et al. | |
| 2010/0093882 A1 | 4/2010 | Ohama | |
| 2010/0159764 A1 | 6/2010 | Takahata et al. | |
| 2010/0324183 A1 | 12/2010 | Henze et al. | |
| 2013/0203936 A1 | 8/2013 | Fujita et al. | |

FOREIGN PATENT DOCUMENTS

| | | |
|---|---|---|
| CN | 101077953 A | 11/2007 |
| EP | 1607451 A1 | 12/2005 |
| JP | 2002-121378 A | 4/2002 |
| JP | 2002-146179 A | 5/2002 |
| JP | 2003-306679 A | 10/2003 |
| JP | 2006-233152 A | 9/2005 |

(Continued)

OTHER PUBLICATIONS

International Search Report for International Application No. PCT/JP2014/083778 dated Mar. 24, 2015.
Reichhold, Hydran HW 311-W-45 Technical Data Sheet, p. 1-2, retrieved Sep. 11, 2017.
Sanyo, Performance Chemicals for Polyurethane and Polyurethane-Related Industries, 2016, p. 1-7.

(Continued)

*Primary Examiner* — Robert S Jones
(74) *Attorney, Agent, or Firm* — Merchant & Gould P.C.

(57) ABSTRACT

Provided is a flame-retardant coating agent for vehicle seats that contains (A) a nitrogen-containing compound, and (C) an aqueous thermoplastic resin. Also provided is a flame-retardant vehicle seat material that does not use a halogen compound or an antimony compound, that exhibits sufficient flame retardancy, and that suppresses the occurrence of marks from hot water.

2 Claims, No Drawings

(56) References Cited

FOREIGN PATENT DOCUMENTS

| | | |
|---|---|---|
| JP | 2006/028488 A | 2/2006 |
| JP | 2006-063125 A | 3/2006 |
| JP | 2007-138005 A | 6/2007 |
| JP | 2013-087122 A | 5/2013 |
| JP | 2013-227685 A | 11/2013 |
| WO | 2009/008239 A1 | 1/2009 |
| WO | 2012/042732 A1 | 4/2012 |

OTHER PUBLICATIONS

Kim B.K. "Aqueous polyurethane dispersions", Colloid Polymer Science, vol. 274: 599-611 (1996).
Lomakin, S.M. et al., "New Concepts in Polymer Science: Modem Polymer Flame Retardancy": 93-96 (2003).

* cited by examiner

FLAME RETARDANT COATING AGENT FOR VEHICLE SEAT, AND MANUFACTURING METHOD FOR FLAME RETARDANT VEHICLE SEAT MATERIAL

CROSS-REFERENCE TO RELATED APPLICATION

This is a divisional of U.S. patent application Ser. No. 15/106,383, filed Jun. 20, 2016, which is a U.S. National Stage Application under 35 U.S.C. § 371 of International Patent Application No. PCT/JP2014/083778, filed Dec. 19, 2014, which claims priority to Japanese Patent Application No. 2013-264561 filed Dec. 20, 2013, the disclosures of all of which are hereby incorporated by reference in their entireties.

TECHNICAL FIELD

The present invention relates to a flame-retardant coating agent for a vehicle seat, and a process for producing a flame-retardant vehicle seat material which has been treated with the coating agent.

BACKGROUND

Hitherto, in the field of flame-retardant coating processing on a vehicle seat material, such as automotive seat material and railcar seat material, there have been used resin compounds containing a halogen-based compound typified by decabromodiphenyl ether blended therein, or an antimony-based compound typified by antimony trioxide blended therein.

In recent years, in view of environmental concerns, it is demanded to use a flame retarder (i.e., flame-retardant agent) other than the halogen-based compounds or the antimony-based compound, and accordingly, there are used phosphorus-based flame retarders having no melting point, typified by ammonium polyphosphate (APP), metal hydroxides such as aluminum hydroxide and magnesium hydroxide, phosphoric acid esters, etc.

In the vehicle seat material, the flame retardancy thereof is an essential performance for saving the life of a passenger. Accordingly, the use of a flame retarder having a "better" flame retardancy is indispensable, but it is pointed out that the above-mentioned metal hydroxides and phosphoric acid esters exhibit a flame retardancy which is inferior to that of the APP. In addition, the use of an organic phosphorus-based flame retarder has a problem of increasing the cost.

On the other hand, APP incurs a low cost while exhibiting a good flame retardancy and therefore, APP is widely used. However, APP is soluble in water and brings about a problem that water spotting or slime may be caused due to the steam treatment at the time of vehicle seat processing, so as to reduce the workability thereof. Herein, the "water spotting" means a phenomenon that, when a seat having water or steam which has been attached thereto after treatment, is dried, the portion to which the water or steam has been attached may be spotted, form a circular stain or be powdered.

In order to solve such a problem, Japanese Unexamined Patent Publication (JP-A, KOKAI) No. 2006-028488 (Patent Document 1) discloses a coating composition for a vehicle interior material, comprising: a synthetic resin emulsion in an amount of 100 mass parts (i.e., parts by mass) in terms of solid content; and 1 to 300 mass parts of one kind or two or more kinds of a non-halogen-based flame retarder added thereto, wherein the non-halogen-based flame retarder has been obtained by coating the surfaces of non-halogen-based flame retarder particles containing phosphorus and nitrogen, with a functional group-containing organosilicon resin. In addition, JP-A No. 2006-063125 (Patent Document 2) discloses a process comprising: preparing a composition of a polyphosphate-based flame-retardant from a polyphosphoric acid compound and a silicone-based resin; and blending the composition with an elastomer resin; and applying the resultant blend to flame-retardant treatment of a fiber product.

However, it is technically difficult to completely coat APP. Accordingly, the solubility of APP in water may be reduced by the methods according to Patent documents 1 and 2, it has been difficult for these methods to reduce the solubility of APP in water at high temperature, particularly, in hot water at 80° C. or more.

As the method using no halogen-based compound, JP-A No. 2006-233152 (Patent Document 3) discloses a flame-retardant fabric, which has attained formaldehyde emission in an amount of 0.1 ppm or less, and comprises: a fabric and a back coating layer of a back coating agent disposed on the surface of one side of the fabric, wherein the back coating agent comprises an acrylic-type copolymer resin having no methylol group in the acrylic monomer thereof; ammonium polyphosphate, a phosphoric acid ester, and a thickener in a specific ratio.

However, in the method according to Patent Document 3, the problem of APP solubility in water has not been solved yet.

In order to make the water spotting unnoticeable, for example, a certain method is practiced such that the thickness of cloth (vehicle seat material) is increased, or the design or color tone is devised. However, in this case, the weight of the cloth may be inevitably increased, or a certain restriction may be imposed on the design or decorative property of the cloth. Accordingly, there is demanded a non-halogen-based flame-retardant coating agent for a vehicle seat, which does not require the measures as mentioned above, and realizes a reduction in weight of a cloth, and also realizes a wide range of design or decorative properties of the cloth, to thereby achieve both of an excellent flame retardancy and suppression of the occurrence of water spotting in the non-halogen-based flame-retardant coating agent for a vehicle seat.

RELATED ART

Patent Document

Patent Document 1: JP-A No. 2006-028488
Patent Document 2: JP-A No. 2006-063125
Patent Document 3: JP-A No. 2006-233152

SUMMARY OF THE INVENTION

Problems to be Solved by the Invention

The present invention has been made in view of the current circumstances as mentioned above. Accordingly, an object of the present invention is to provide a flame-retardant vehicle seat material which is capable of developing sufficient flame retardancy and of suppressing the occurrence of water spotting by hot water, without using a halogen compound or an antimony compound.

Means for Solving the Problem

As a result of earnest study, the present inventors have found that the use of a flame-retardant coating agent for a vehicle seat, containing a specific nitrogen-containing compound and a specific thermoplastic resin, can attain a flame-retardant vehicle seat material which is excellent in the flame retardancy and is prevented from the occurrence of water spotting by hot water. The present invention has been accomplished based on such a discovery.

One aspect (a) of the present invention can provide a flame-retardant coating agent for a vehicle seat, which comprises: (A) a nitrogen-containing compound and (C) a thermoplastic resin.

The present invention can also provide a flame-retardant coating agent for a vehicle seat, which comprises: (A) a nitrogen-containing compound, (C) an aqueous thermoplastic resin, and (B) a phosphorus-based compound, and/or (D) a metal hydroxide.

The present invention may include, for example, the following embodiments.

[a1] A flame-retardant coating agent for a vehicle seat, comprising: (A) a nitrogen-comprising: compound and (C) an aqueous thermoplastic resin.

[a2] A flame-retardant coating agent for a vehicle seat, comprising: (A) a nitrogen-containing compound, (C) an aqueous thermoplastic resin, (B) a phosphorus-based compound, and/or (D) a metal hydroxide.

[a3] The flame-retardant coating agent for a vehicle seat according to either one of [a1] and [2], wherein Compound (A) is at least one kind selected from the group consisting of melamine compounds, triazine compounds, and a salt thereof with (iso)cyanuric acid.

[a4] The flame-retardant coating agent for a vehicle seat according to either one of [a2] and [3], wherein Compound (B) is at least one kind selected from the group consisting of the compounds represented by the following formulae (1) to (5) and a polyphosphoric acid compound and Compound (D) is at least one kind selected from the group consisting of aluminum hydroxide, magnesium hydroxide and calcium hydroxide:

Formula (1):

[Chemical Formula 1]

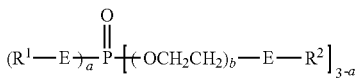

Formula (1)

(wherein each of $R^1$ and $R^2$ independently represents a phenyl group that may have an alkyl group having a carbon number of 1 to 4, a naphthyl group that may have an alkyl group having a carbon number of 1 to 4, or a biphenyl group that may have an alkyl group having a carbon number of 1 to 4, E represents a direct bond, —O— or —N(H)—, "a" represents 1 or 2, and b represents 0 or 1);

Formula (2):

[Chemical Formula 2]

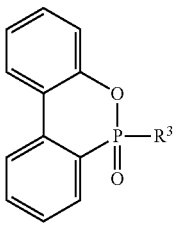

Formula (2)

(wherein $R^3$ represents a benzyl group, a methylbenzyl group, a phenethyl group, a naphthylmethyl group, or a group represented by the following formula (6)):

Formula (6):

[Chemical Formula 3]

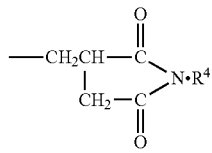

Formula (6)

(wherein $R^4$ represents an alkyl group having a carbon number of 1 to 10, a phenyl group, or a benzyl group);

Formula (3):

[Chemical Formula 4]

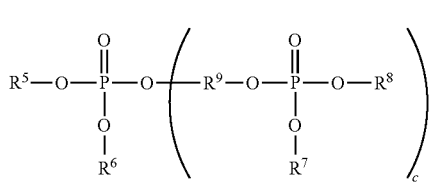

Formula (3)

(wherein each of $R^5$ to $R^8$ independently represents a phenyl group that may have an alkyl group having a carbon number of 1 to 4, $R^9$ represents an arylene group that may have a substituent, and c represents an integer of 1 to 5);

Formula (4):

[Chemical Formula 5]

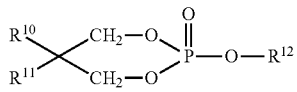

Formula (4)

(wherein each of $R^{10}$ and $R^{11}$ independently represents an alkyl group having a carbon number of 1 to 4, and $R^{12}$ represents a biphenyl group or a naphthyl group); and Formula (5):

[Chemical Formula 6]

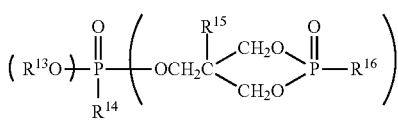

Formula (5)

(wherein each of $R^{13}$ to $R^{16}$ independently represents an alkyl group having a carbon number of 1 to 4).

[a5] The flame-retardant coating agent for a vehicle seat according to any one of [a1] to [a4], wherein Compound (C) is a polyurethane resin having an anionic group.

[a6] The flame-retardant coating agent for a vehicle seat according to any one of [a2] to [a5], wherein the mixing ratio (A):{(B)+(D)} of Compound (A) to the total of Compound (B) and Compound (D) is, in mass ratio, 1:0.1 to 15 and the mixing ratio {(A)+(B)+(D)}:(C) of the total of Compound (A), Compound (B) and Compound (D) to Compound (C) is, in mass ratio, 1:9 to 9.5:0.5.

[a7] A process for producing a flame-retardant vehicle seat material, comprising treating one surface of a vehicle seat material with the flame-retardant coating agent for a vehicle seat according to any one of [a1] and [a3] to [a6] and then drying it to form a flame-retardant film comprising: Compound (A) and Compound (C) on the treated surface of the vehicle seat material and/or in the vehicle seat material, to thereby obtain a flame-retardant vehicle seat material.

[a8] A process for producing a flame-retardant vehicle seat material, comprising treating one surface of a vehicle seat material with the flame-retardant coating agent for a vehicle seat according to any one of [a2] to [a6] and then drying it to form a flame-retardant film comprising: Compound (A), Compound (C), Compound (B) and/or Compound (D) on the treated surface of the vehicle seat material and/or in the vehicle seat material, to thereby obtain a flame-retardant vehicle seat material.

According to another aspect (b) of the present invention, there is provided a flame-retardant coating agent for a vehicle seat, which comprises: (A) a nitrogen-containing compound, (B) a phosphorus-based compound, and (C) an aqueous thermoplastic resin.

The "aspect (b)" of the present invention may include, for example, the following embodiments.

[b1] A flame-retardant coating agent for a vehicle seat, containing (A) a nitrogen-containing compound, (B) a phosphorus-based compound, and (C) an aqueous thermoplastic resin.

[b2] The flame-retardant coating agent for a vehicle seat according to [b1], wherein Compound (A) is at least one kind selected from the group consisting of a melamine compound, a triazine compound, and a salt thereof with an (iso)cyanuric acid.

[b3] The flame-retardant coating agent for a vehicle seat according to [b1] or [b2], wherein Compound (B) is at least one kind selected from the group consisting of the compounds represented by the following formulae (1) to (5) and a polyphosphoric acid compound:

Formula (1):

[Chemical Formula 7]

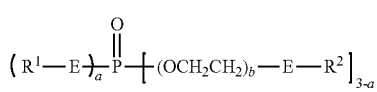

Formula (1)

(wherein each of $R^1$ and $R^2$ independently represents a phenyl group that may have an alkyl group having a carbon number of 1 to 4, a naphthyl group that may have an alkyl group having a carbon number of 1 to 4, or a biphenyl group that may have an alkyl group having a carbon number of 1 to 4, E represents a direct bond, —O— or —N(H)—, a represents 1 or 2, and b represents 0 or 1);

Formula (2)

[Chemical Formula 8]

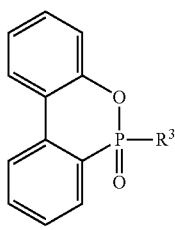

Formula (2)

(wherein $R^3$ represents a benzyl group, a methylbenzyl group, a phenethyl group, a naphthylmethyl group, or a group represented by the following formula (6)):

Formula (6):

[Chemical Formula 9]

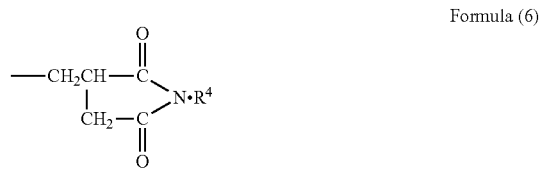

Formula (6)

(wherein $R^4$ represents an alkyl group having a carbon number of 1 to 10, a phenyl group, or a benzyl group);

Formula (3):

[Chemical Formula 10]

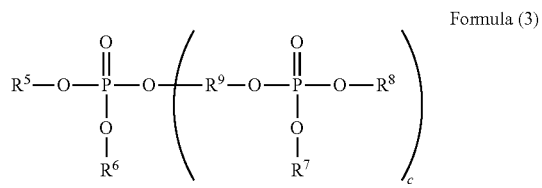

Formula (3)

(wherein each of $R^5$ to $R^8$ independently represents a phenyl group that may have an alkyl group having a carbon number of 1 to 4, $R^9$ represents an arylene group that may have a substituent, and c represents an integer of 1 to 5);

Formula (4):

[Chemical Formula 11]

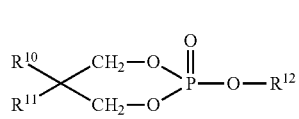

Formula (4)

(wherein each of $R^{10}$ and $R^{11}$ independently represents an alkyl group having a carbon number of 1 to 4, and $R^{12}$ represents a biphenyl group or a naphthyl group); and Formula (5):

[Chemical Formula 12]

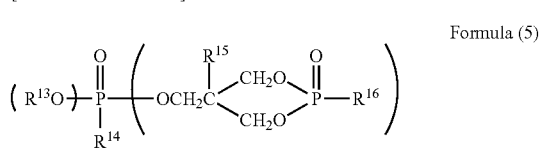

Formula (5)

(wherein each of $R^{13}$ to $R^{16}$ independently represents an alkyl group having a carbon number of 1 to 4).

[b4] The flame-retardant coating agent for a vehicle seat according to any one of [b1] to [b3], wherein Compound (C) is a polyurethane resin having an anionic group.

[b5] The flame-retardant coating agent for a vehicle seat according to any one of [b1] to [b4], wherein the mixing ratio (A):(B) of Compound (A) to Compound (B) is, in mass ratio, 1:0.1 to 10, and the mixing ratio (A)+(B):(C) of the total of Compound (A) and Compound (B) to Compound (C) is, in mass ratio, 3:7 to 9:1.

[b6] A process for producing a flame-retardant vehicle seat material, including treating one surface of a vehicle seat material with the flame-retardant coating agent for a vehicle seat according to any one of [b1] to [b5], and drying it to form a flame-retardant film containing Compound (A), Compound (B), and Compound (C) on the treated surface of the vehicle seat material and/or in the vehicle seat material, to thereby obtain a flame-retardant vehicle seat material.

In the above-mentioned "another aspect" of the present invention, the mixing ratio (A):(B) of Compound (A) to Compound (B) in the flame-retardant coating agent for a vehicle seat of the present invention may be preferably, in mass ratio, 1:0.1 to 10, more preferably 1:0.1 to 7, still more preferably 1:0.1 to 5. Outside this range, the flame retardancy may tend to be reduced.

In the above-mentioned "another aspect b" of the present invention, the mixing ratio (A)+(B):(C) of the total of Compound (A) and Compound (B) to Compound (C) may be preferably, in mass ratio, 3:7 to 9:1, more preferably 4:6 to 9:1, still more preferably 5:5 to 9:1. If the total of Compound (A) and Compound (B) is less than 30 mass % of the total of Compound (A), Compound (B) and Compound (C), the flame retardancy may be likely to be reduced, whereas if it exceeds 90 mass %, there may be, for example, a tendency that productization of the coating agent is difficult, a tendency that the texture is hardened or powdering occurs, and a tendency that the adhesiveness of the flame-retardant film to the seat material is reduced to fail in obtaining sufficient cloth strength.

According to the aspect b of the present invention, a more advantageous effect can be obtained in terms of "enhancement of flame retardancy, capability of texture adjustment, prevention of powdering, improvement of adhesiveness, and equalization of coated state".

According to another aspect c of the present invention, a flame-retardant coating agent for a vehicle seat, containing (A) a nitrogen-containing compound, (D) a metal hydroxide, and (C) an aqueous thermoplastic resin may be provided.

According to the aspect c of the present invention, an effect that "the cost is reduced, the thickness and penetration degree of the coating layer are easily adjusted, the texture control is easy, and the checking of processing history is facilitated" can be obtained.

According to another aspect d of the present invention, a flame-retardant coating agent for a vehicle seat, containing (A) a nitrogen-containing compound, (B) a phosphorus-based compound, (C) an aqueous thermoplastic resin, and (D) a metal hydroxide may be provided.

According to the aspect d of the present invention, an effect combining and balancing the effect in the aspect b and the effect in the aspect c can be obtained.

Effect of the Invention

According to the flame-retardant coating agent for a vehicle seat of the present invention, it is possible to provide a flame-retardant vehicle seat material, which contains no halogen and no antimony, and is capable of developing sufficient flame retardancy equal to or greater than that of APP, and of suppressing the occurrence of water spotting by hot water.

MODES FOR CARRYING OUT THE INVENTION

Hereinbelow, the flame-retardant coating agent for a vehicle seat and the process for producing a flame-retardant vehicle seat material according to the present invention will be described in detail.

(A) Nitrogen-Containing Compound (A) Nitrogen-containing compound (hereinafter, simply referred to as "Compound (A)"), when it is used in combination with (B) phosphorus-based compound (hereinafter, simply referred to as "Compound (B)") appearing hereinafter, can provide both of the excellent flame retardancy and the suppression of the occurrence of water spotting by hot water, at a higher level than those provided in a case where each of Compound (A) and Compound (B) is used alone.

Specific examples of Compound (A) may include: melamine compounds, guanamine compounds; triazine compounds; cyanuric acid compounds; and salts of an acid and at least one kind selected from the group consisting of melamine compounds, guanamine compounds and triazine compounds; etc.

Specific examples of the melamine compound may include: melamine; substituted melamine compounds, e.g., alkylmelamines such as 2-methylmelamine, and guanylmelamines; deammoniation condensation products of melamine, such as melam, melem, melon and methone; etc.

Specific examples of the guanamine compound may include: guanamine, methylguanamine, acetoguanamine, benzoguanamine, succinoguanamine, 3,9-bis[2-(3,5-di-amino-2,4,6-triazaphenyl)ethyl]-2,4,8,10-tetraoxaspiro[5,5] undecane, etc.

Specific examples of the triazine compound may include: 1,2,3-triazine, 1,2,4-triazine, 1,3,5-triazine, benzotriazine, and amino group-containing triazins wherein 1 to 3 amino groups are substituted on a carbon atom constituting the above compound.

Specific examples of the cyanuric acid compound may include: (iso)cyanuric acid (herein, "(iso)cyanuric acid" represents both cyanuric acid and isocyanuric acid), ammeline, ammelide, etc. The isocyanuric acid compound may also be either hydrate or anhydride thereof.

Specific examples of the acid capable of forming a salt with at least one kind selected from the group consisting of melamine compounds, guanamine compounds and triazine compounds may include: organic acids such as (iso)cyanuric acid, formic acid, acetic acid, oxalic acid, malonic acid, lactic acid, citric acid, benzoic acid, isophthalic acid and terephthalic acid; and inorganic acids such as hydrochloric acid, nitric acid, sulfuric acid, pyrosulfuric acid, methanesulfonic acid, ethanesulfonic acid, para-toluenesulfonic acid, dodecylbenzenesulfonic acid, sulfamic acid, phosphoric acid, pyrophosphoric acid, polyphosphoric acid, phosphonic acid, phenylphosphonic acid, alkylphosphonic acid, phosphorous acid, boric acid and tungstic acid.

One of these Compounds (A) may be used alone, and two or more thereof may also be used in combination, as desired.

Among these Compounds (A), in view of the flame retardancy, it is preferred to use melamine compounds, triazine compounds, and salts thereof with (iso)cyanuric acid.

Among the melamine compounds, deammoniation condensation products of melamine, such as melam, melem and melon, may be preferred.

Among the triazine compounds, amino group-containing triazine compounds (particularly, amino group-containing 1,3,5-triazine) may be preferred.

Among the salts of melamine compounds or triazine compound with (iso)cyanuric acid, adducts of melamine compounds and (iso)cyanuric acid (salts of melamine compounds and (iso)cyanuric acid) may be preferred. The ratio (molar ratio) of the former to the later may not be particularly limited but, for example, the ratio of former:latter may be preferably 3:1 to 1:2, more preferably 2:1 to 1:2. Among these, melamine cyanurate (i.e., salt of melamine and (iso) cyanuric acid), and melem salts, melam salts, melon salts, etc., corresponding to the melamine salts may be preferred. The salt of melamine compounds and (iso)cyanuric acid, unreacted melamine compound or (iso)cyanuric acid may also be contained therein.

In the present invention, in view of reducing water spotting, Compound (A) may preferably be water-insoluble. The "water-insoluble" means that, when Compound (A) is powderized (in the case of a solid), and 10 g of Compound (A) is then put into 100 g of ion-exchanged water at 20° C., and strongly shaken at 20° C.±0.5° C. for 1 minute, the degree (gram) to which Compound (A) is dissolved in 100 g of ion-exchanged water is 1.0 g or less. The "dissolves" as used herein means that the resultant mixture gives a transparent solution, or the above mixing can be conducted in an arbitrary ratio, so as to provide a transparent mixture.

Among such Compounds (A), melamine cyanurate may be most preferred.

(B) Phosphorus-Based Compound

In the present invention, (B) a phosphorus-based compound may be used, as desired.

Specific examples of Compound (B) may include the compounds represented by formulae (1) to (5), polyphosphoric acid compounds, and aluminum phosphates.

One of these compounds (B) may be used alone, or two or more thereof may be used in combination, as desired.

(Compound of Formula (1))

Specific examples of the compound represented by formula (1) may include: triphenyl phosphate (melting point: 50° C.), naphthyl diphenyl phosphate (melting point: 61° C.), dinaphthyl phenyl phosphate, trinaphthyl phosphate (melting point: 111° C.), biphenyl diphenyl phosphate (liquid state at 20° C.), tricresyl phosphate (liquid state at 20° C.), trixylenyl phosphate (liquid state at 20° C.), phenoxyethyl diphenyl phosphate (melting point: 80° C.), ethylhexyl diphenyl phosphate (liquid state at 20° C.), tri(isopropylphenyl) phosphate (liquid state at 20° C.), di(phenoxyethyl) phenyl phosphate, phenoxyethyl dinaphthyl phosphate, di(phenoxyethyl)naphthyl phosphate, naphthoxyethyl diphenyl phosphate, di(naphthoxyethyl)phenyl phosphate, naphthoxyethyl dinaphthyl phosphate, di(naphthoxyethyl) naphthyl phosphate, anilinodiphenyl phosphate (melting point: 130° C.), dianilinophenyl phosphate, trianilinophosphate, triphenylphosphine oxide (melting point: 157° C.), etc.

One of these compounds may be used alone, or two or more thereof may also be used in combination. Among these, in view of the flame retardancy, phenoxyethyl diphenyl phosphate (melting point: 80° C.), anilinodiphenyl phosphate, triphenylphosphine oxide, or trixylenyl phosphate (liquid state at 20° C.) may preferably be used.

(Compound of Formula (2))

Specific examples of the compound represented by formula (2) may include: 10-benzyl-9,10-dihydro-9-oxa-10-phsphaphenathrene-10-oxide (melting point: 115° C.), 10-(4-methylbenzyl)-9,10-dihydro-9-oxa-10-phsphaphenanthrene-10-oxide, 10-phenethyl-9,10-dihydro-9-oxa-10-phsphaphenanthrene-10-oxide, 10-(1-naphthylmethyl)-9,10-dihydro-9-oxa-10-phsphaphenanthrene-10-oxide, 10-(2-naphthylmethyl)-9,10-dihydro-9-oxa-10-phsphaphenanthrene-10-oxide, butyl[3-(9,10-dihydro-9-oxa-10-phsphaphenanthrene-10-oxid-10-yl)methyl]succinimide, phenyl[3-(9,10-dihydro-9-oxa-10-phsphaphenanthrene-10-oxid-10-yl)methyl]succinimide, benzyl[3-(9,10-dihydro-9-oxa-10-phsphaphenanthrene-10-oxid-10-yl)methyl]succinimide (melting point: 143° C.), etc. One of these compounds may be used alone, or two or more thereof may also be used in combination. Among these, in view of the flame retardancy, 10-benzyl-9,10-dihydro-9-oxa-10-phsphaphenanthrene-10-oxide may preferably be used.

(Compound of Formula (3))

In formula (3), the arylene group represented by $R^9$ may have a substituent, and specific examples of the substituent may include: alkyl group having a carbon number of 1 to 4, and hydroxy group. Specific examples of the arylene group may include: phenylene group, biphenylene group, methylenebisphenylene group, dimethylmethylenebisphenylene group, and sulfone bisphenylene group.

Specific examples of the compound represented by formula (3) may include: resorcinol di-2,6-xylenyl phosphate (melting point: 95° C.), resorcinol diphenyl phosphate (liquid state at 20° C.), hydroquinonedi-2,6-xylenyl phosphate, 4,4'-biphenoldi-2,6-xylenyl phosphate, 4,4'-biphenoldiphenyl phosphate, 4,4'-biphenoldicresyl phosphate, biphenol A diphenyl phosphate (liquid state at 20° C.), biphenol A dicresyl phosphate (liquid state at 20° C.), etc. One of these compounds may be used alone, or two or more thereof may also be used in combination. Among these, in view of the flame retardancy, resorcinol di-2,6-xylenyl phosphate or resorcinol diphenyl phosphate (liquid state at 20° C.) may preferably be used.

(Compound of Formula (4))

Specific examples of the compound represented by formula (4) may include: 5,5-dimethyl-2-(2'-phenylphenoxy)-1,3,2-dioxaphospholinane-2-oxide (melting point: 129° C.), 5,5-dimethyl-2-(4'-phenylphenoxy)-1,3,2-dioxaphospholinane-2-oxide, 5-butyl-5-ethyl-2-(4'-phenylphenoxy)-1,3,2-dioxaphospholinane-2-oxide, 5,5-dimethyl-2-(2'-naphthyloxy)-1,3,2-dioxaphospholinane-2-oxide, etc. One of these compounds may be used alone, or two or more thereof may also be used in combination. Among these, in view of the flame retardancy, 5,5-dimethyl-2-(2'-phenylphenoxy)-1,3,2-dioxaphospholinane-2-oxide may preferably be used.

(Compound of Formula (5))

Specific examples of the compound represented by formula (5) may include: 5-ethyl-5-[[[methoxy(methyl)phosphinyl]oxy]methyl]-2-methyl-1,3,2-dioxaphospholinane 2-oxide (liquid state at 20° C.).

Among the compounds represented by formulae (1) to (5), in view of reducing water spotting, compounds having a melting point of 95° C. or more, or a melting point of 20° C. or less may be preferred.

A compound having a melting point of 95° C. or more may impart a hard texture (or feel) to the flame-retardant seat material, and a compound having a melting point of 20° C. or less may impart a soft texture. Accordingly, the combination of the compound having a melting point of 95° C. or more and the compound having a melting point of 20° C. or less may also be advantageous in that the texture may arbitrarily be adjusted.

(Polyphosphoric Acid Compound)

The polyphosphoric acid compound may include: polyphosphoric acid, ammonium polyphosphate, polyphosphoric acid amide, polyphosphoric acid carbamate, sodium tripolyphosphate, potassium polyphosphate, ammonium potassium polyphosphate, guanidine polyphosphate, melamine polyphosphate, guanylurea phosphate, surface-coated ammonium polyphosphate, etc.

Among these, in view of the flame retardancy and water spotting reduction, surface-coated ammonium phosphate may be preferred. Among others, the surface-coated ammonium polyphosphate may preferably be silane-coated or melamine-coated ammonium polyphosphate. In view of not emitting VOC, silane-coated ammonium polyphosphate may more preferably be used.

Specific examples of the silane-coated ammonium polyphosphate may include: FRCROS 486 (mfd. by Budenheim), Exflam APP-204 (mfd. by Wellchem), APP-102, APP-105 (mfd. by JLS), APP-5 (mfd. by Xi'an Chemical Industries), etc.

In the present invention, in view of reducing water spotting, Compound (B) may preferably be water-insoluble. The "water-insoluble" means that, when Compound (B) is powderized (in the case of a solid), and 10 g of Compound (B) is then put into 100 g of ion-exchanged water at 20° C., and strongly shaken at 20° C.±0.5° C. for 1 minute, the degree (gram) to which Compound (B) is dissolved in 100 g of ion-exchanged water is 1.0 g or less. The "dissolves" as used herein means that the resultant mixture gives a transparent solution, or the above mixing can be conducted in an arbitrary ratio, so as to provide a transparent mixture.

Among these compounds (B), in view of the flame retardancy, water spotting reduction and cost, biphenyl diphenyl phosphate, tricresyl phosphate, tri-2,6-xylenyl phosphate, 10-benzyl-9,10-dihydro-9-oxa-10-phosphaphenanthrene-10-oxide, and resorcinol di-2,6-xylenyl phosphate may be more preferred.

(C) Aqueous Thermoplastic Resin (C) Aqueous thermoplastic resin (hereinafter, simply referred to as "Compound (C)") is a binder resin to be used for fixing Compound (A) (as desired, further Compound (B) and/or Compound (D)) to the vehicle seat material. When "Compound (C)" is used in combination with Compound (A) (as desired, further Compound (B) and/or Compound (D)), it may produce an effect of imparting good flame retardancy to the vehicle seat material, and of suppressing the occurrence of water spotting by hot water.

In an embodiment of the present invention containing Compound (A) and Compound (C), in view of the flame retardancy, texture, powdering, and adhesiveness of the flame-retardant film to the seat material, etc., the mixing ratio (A):(C) of Compound (A):Compound (C) may preferably be, in mass ratio, 1:9 to 9.5:0.5, more preferably 3:7 to 9:1, still more preferably 4:6 to 9:1, yet still more preferably 5:5 to 9:1.

In the present invention, the "aqueous thermoplastic resin" refers to a thermoplastic resin having a property such that, even when 200 mL of a water-emulsified/dispersed liquid of the thermoplastic resin at a concentration in water of 40 mass % is put into a 200-mL glass vessel (with a lid) and then the lid is closed, and thereafter the glass vessel is left standing still on an ordinary lab bench at 20° C. for 12 hours, the separation or precipitation is not observed in the water-emulsified/dispersed liquid.

Specific examples of the Compound (C) may include: aqueous acrylic resins, acrylic polyurethane resins, aqueous vinyl acetate resins, and aqueous ethylene-vinyl acetate resins, etc.

One of these Compounds (C) may be used alone, or two or more may also be used in combination.

Among these, Compound (C) may preferably be an aqueous acrylic resin in view of the soft texture and cost; may preferably be an aqueous polyurethane resin in view of the flame retardancy and hard texture; and may preferably be an aqueous polyurethane resin; and more preferably be an anionic group-containing polyurethane resin, in view of reduction of water spotting.

The combination of an aqueous acrylic resin and an aqueous polyurethane resin may also be advantageous in that the texture of the flame-retardant seat material may arbitrarily be adjusted.

As the aqueous acrylic resin, a commercially available product may be used. Examples thereof may include: Nikasol Series (mfd. by Nippon Carbide Industries Co., Inc.), Polysol Series (mfd. by Showa Highpolymer Co., Ltd.), Saivinol Series (mfd. by Saiden Chemical Industry Co., Ltd.), and Newcoat FH Series (mfd. by Shin-Nakamura Chemical Co., Ltd.).

(Anionic Group-Containing Polyurethane Resin)

As the anionic group-containing polyurethane resin, it is preferred to use an anionic group-containing aqueous polyurethane resin, which has been obtained by a method wherein an isocyanate group-terminated neutralized prepolymer having an anionic group; the isocyanate group-terminated neutralized prepolymer having been obtained by reacting (a) an organic polyisocyanate, (b) a polyol, and (c) a compound having an anionic group and two or more active hydrogen atoms; is emulsified/dispersed in water by self-emulsification so as to cause a chain extension reaction by using (d) a polyamine compound having two or more amino groups and/or imino groups.

The anionic group may include a carboxyl group (—COOH), a carboxylate group (—COO$^-$), a sulfo group (—SO$_3$H), a sulfonate group (—SO$_3^-$), etc. Among others, the anionic group may preferably be a carboxyl group and/or a carboxylate group, in view of having a tendency that the emulsification/dispersion stability of an anionic group-containing self-emulsifying polyurethane resin is excellent and a tendency that the flame retardancy of a flame-retardant vehicle seat material is little reduced, and a good effect of reducing water spotting is provided.

The content of the anionic group may preferably be 0.1 to 5.0 mass %, more preferably 0.2 to 4.0 mass %, still more preferably 0.5 to 2.5 mass %. Here, the base for calculating "mass %" is the mass of a resin containing an anionic group. That is, the "mass %" is calculated theoretically from the chemical structural formula and mixing amount of the resin.

If the content of the anionic group is less than the lower limit as stated above, the aqueous polyurethane resin may be difficult to be emulsified/dispersed, so as to show a tendency that the stability of the water-emulsified/dispersed liquid of the thermoplastic resin is deteriorated and a tendency that the flame retardancy is reduced or water spotting is worsened. If the content of the anionic group exceeds the upper limit as stated above, the aqueous polyurethane resin may be difficult to cause sharp heat-sensitive solidification, so as to show a tendency that bleed-through (or strike-through) occurs.

One of these aqueous polyurethane resins may be used alone, or two or more thereof may also be used in combination, as desired.

<(a) Organic Polyisocyanate>

The (a) organic polyisocyanate which is usable at the time of producing the aqueous polyurethane resin according to the present invention may not be particularly limited. For example, diisocyanate compounds, triisocyanate compounds, and modified polyisocyanate compounds such as dimers or trimers of diisocyanate compound, may be used as the (a) organic polyisocyanate.

Specific examples of the diisocyanate compound may include: aliphatic diisocyanate compounds such as tetramethylene diisocyanate, hexamethylene diisocyanate, dodecamethylene diisocyanate, and trimethylhexamethylene diisocyanate; alicyclic diisocyanate compounds such as isophorone diisocyanate, hydrogenated xylylene diisocyanate, dicyclohexylmethane diisocyanate, norbornane diisocyanate, 1,3-bis(isocyanatomethyl)cyclohexane, and 3,3'-dimethyl-4,4'-dicyclohexylmethane diisocyanate; and aromatic diisocyanate compounds such as phenylene diisocyanate, tolylene diisocyanate, diphenylmethane diisocyanate, 3,3'-dimethyl-4,4'-biphenylene diisocyanate, 3,3'-dichloro-4,4'-biphenylene diisocyanate, naphthalene diisocyanate, tolidine diisocyanate, xylylene diisocyanate, and tetramethylxylylene diisocyanate, etc.

Specific examples of the triisocyanate compound may include: triphenylmethane triisocyanate, dimethyltriphenylmethane tetraisocyanate, and tris(isocyanatophenyl)-thiophosphate, etc.

The modified polyisocyanate compound derived from a diisocyanate compound may not be particularly limited as long as it has two or more isocyanate groups. Specific examples thereof may include: polyisocyanates having a buiret structure, an isocyanurate structure, a urethane structure, a uretdione structure, an allophanate structure, a trimer structure, etc.; trimethylolpropane adducts of aliphatic isocyanate, and polymeric MDI (MDI=diphenylmethane diisocyanate), etc.

One of these polyisocyanate compounds may be used alone, or two or more thereof may also be used in combination, as desired.

Among these polyisocyanate compounds, an aliphatic polyisocyanate and an alicyclic polyisocyanate may have a tendency of providing a non-yellowing flame-retardant seat material, and therefore, may preferably be used.

<(b) Polyol>

The (b) polyol usable at the time of producing the aqueous polyurethane resin according to the present invention may not be particularly limited as long as it has two or more hydroxyl groups, and polyester polyols, polycarbonate polyols, polyether polyols, dimer diols, etc., may be used as the (b) polyol.

(Polyester Polyol)

Specific examples of the polyester polyol may include: polyethylene adipate diols, polybutylene adipate diols, polyethylene-butylene adipate diols, polyhexamethylene isophthalate adipate diols, polyhexamethylene succinate diols, polybutylene succinate diols, polyethylene sebacate diols, polybutylene sebacate diols, poly-ω-caprolactone diols, poly(3-methyl-1,5-pentylene)adipate diols, polycondensates of 1,6-hexanediol and dimer acid, copolycondensates of 1,6-hexanediol, adipic acid and dimer acids, polycondensates of nonane diol and dimer acid, and copolycondensates of ethylene glycol, adipic acid and dimer acid, etc.

(Polycarbonate Polyol)

Specific examples of the polycarbonate polyol may include: polycarbonate polyols which have been obtained by the reaction of a glycol such as 1,4-butanediol, 1,6-hexanediol and diethylene glycol, with diphenyl carbonate, phosgene, etc. Specific examples of the polycarbonate polyol may include: polytetramethylene carbonate diols, polyhexamethylene carbonate diols, 3-methyl-1,5-pentanediol carbonate diols, poly-1,4-cyclohexanedimethylene carbonate diols, and 1,6-hexanediol polycarbonate diols, etc.

(Polyether Polyol)

Specific examples of the polyether polyol may include: polymers which have been obtained by the addition polymerization, in an ordinary manner, of a compound having at least two active hydrogen atoms, such as ethylene glycol, diethylene glycol, triethylene glycol, propylene glycol, trimethylene glycol, 1,3-butanediol, 1,4-butanediol, 1,5-pentanediol, 1,6-hexanediol, neopentyl glycol, glycerin, trimethylolethane, trimethylolpropane, sorbitol, sucrose, bisphenol A, bisphenol S, hydrogenated bisphenol A, aconitic acid, trimellitic acid, hemimellitic acid, phosphoric acid, ethylenediamine, diethylenetriamine, triisopropanolamine, pyrogallol, dihydroxybenzoic acid, hydroxyphthalic acid, 1,2,3-propanetrithiol, monoethanolamine, diethanolamine, and triethanolamine; with one kind of monomer or two or more kinds of monomers, such as ethylene oxide, propylene oxide, butylene oxide, styrene oxide, trimethylene oxide, tetramethylene oxide, epichlorohydrin, tetrahydrofuran, and cyclohexylene. In this case, the method for addition polymerization may be any of homopolymerization, block copolymerization, and random copolymerization, etc.

(Dimer Diol)

Specific examples of the dimer diol may include compounds containing, as the main component, a diol which has been obtained by reducing a polymerized fatty acid. The polymerized fatty acid may include compounds which have been obtained by Diels-Alder type bimolecular polymerization reaction of: unsaturated fatty acids having a carbon number of 18, such as oleic acid and linoleic acid; drying oil fatty acids, semidrying oil fatty acids, and lower monoalcohol esters of these fatty acids.

One of these polyols may be used alone, or two or more thereof may also be used in combination, as desired. The weight-average molecular weight of the polyol may preferably be 500 to 5,000, more preferably 1,000 to 3,000. The "weight-average molecular weight" is determined by calculation based on the analysis value=OHV (OH value) available from the manufacturer of the raw material.

Among these polyols, from the standpoint that the flame-retardant seat material little suffers from a reduction in the strength due to hydrolysis with the elapse of time, at least one kind selected from the group consisting of: polycarbonate polyols and polyether polyols may be preferred.

<(c) Compound Having Anionic Group and Two or More Active Hydrogens>

The (c) compound having an anionic group and two or more active hydrogen atoms, which may be used at the time of producing the aqueous polyurethane resin according to the present invention, may not be particularly limited. Specific examples thereof may include: carboxyl group-containing low molecular diols such as 2,2-dimethylolpropionic acid and 2,2-dimethylolbutanoic acid, sulfone group-containing low molecular diols such as 2-sulfo-1,3-propanediol and 2-sulfo-1,4-butanediol; and ammonium salts, organic amine salts (such as those of trimethylamine, triethylamine, tri-n-propylamine, tributylamine, triethanolamine, N,N-dimethyldiethanolamine and N,N-diethylethanolamine, alkali metal salts (such as those of sodium and potassium) of these carboxyl group-containing low molecular diols or sulfone group-containing low molecular diols as stated above. One of these compounds may be used alone, or two or more thereof may also be used in combination, as desired.

<(d) Polyamine Compound Having Two or More Amino Groups and/or Imino Groups>

The (d) polyamine compound having two or more amino groups and/or imino groups, which may be used at the time of producing the aqueous polyurethane resin according to the present invention, may not be particularly limited. Specific examples thereof may include: diamines such as ethylenediamine, propylenediamine, tetramethylenediamine, hexamethylenediamine, diaminocyclohexylmethane, piperazine, hydrazine, 2-methylpiperazine, isophoronediamine, norbornanediamine, diaminodiphenylmethane, tolylenediamine, and xylylenediamine; polyamines such as diethylenetriamine, triethylenetetramine, tetraethylenepentamine, iminobispropylamine, and tris(2-aminoethyl)amine; amidoamines derived from di-primary-amine and monocarboxylic acid; water-soluble amine derivatives such as monoketimin of di-primary-amine; and hydrazine derivatives such as oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide, itaconic acid dihydrazide, 1,1'-ethylene dihydrazine, 1,1'-trimethylene dihydrazine, and 1,1'-(1,4-butylene)dihydrazine, etc. One of these polyamine compounds having two or more amino groups and/or imino groups may be used alone, or two or more thereof may also be used in combination, as desired.

(Anionic Group-Containing Polyurethane Resin)

The anionic group-containing polyurethane resin may be obtained as an emulsified/dispersed liquid of the polyurethane resin by emulsifying/dispersing an isocyanate group-terminated neutralized prepolymer having an anionic group in water by self-emulsification so as to cause a chain extension reaction.

The isocyanate group-terminated neutralized prepolymer having an anionic group may be an isocyanate group-terminated neutralized prepolymer having a group resulting from the neutralization of an anionic group originating in the (c) compound having an anionic group and two or more active hydrogen atoms, and may be obtained by reacting the (a) organic polyisocyanate, the (b) polyol, and the (c) compound having an anionic group and two or more active hydrogen atoms.

Specific method for obtaining the isocyanate group-terminated neutralized prepolymer having an anionic group may not be particularly limited, and the compound may be produced, for example, by a conventionally known one-stage (so-called one-shot), or multi-stage isocyanate polyaddition reaction method. At this time, the reaction temperature may preferably be 40 to 150° C.

(Low Molecular-Weight Chain Extender)

At the time of reaction as stated above, a low molecular-weight chain extender having two or more active hydrogen atoms may be used, as desired. The low molecular-weight chain extender may preferably be a chain extender having a molecular weight of 400 or less, particularly 300 or less. Specific examples of the low molecular chain extender may include: low molecular-weight polyhydric alcohols such as ethylene glycol, propylene glycol, neopentyl glycol, 1,4-butanediol, 1,6-hexanediol, trimethylolpropane, pentaerythritol, and sorbitol; and low molecular-weight polyamines such as ethylenediamine, propylenediamine, hexamethylenediamine, diaminocyclohexylmethane, piperazine, 2-methylpiperazine, isophoronediamine, diethylenetriamine, and triethylenetetramine. One of these low molecular-weight chain extenders may be used alone, or two or more thereof may also be used in combination.

(Neutralization of Anionic Group)

The neutralization of an anionic group originating in the (c) compound having an anionic group and two or more active hydrogen atoms may be effected simultaneously with the preparation of an isocyanate group-terminated prepolymer, or before or after such a preparation. The neutralization may be performed by appropriately using a known method, and the compound used for the neutralization may not be particularly limited. Specific examples thereof may include: amines such as trimethylamine, triethylamine, tri-n-propylamine, tributylamine, N-methyl-diethanolamine, N,N-dimethylmonoethanolamine, N,N-diethylmonoethanolamine, and triethanolamine; potassium hydroxide; sodium hydroxide; sodium carbonate; ammonia, etc. Among these, tertiary amines such as trimethylamine, triethylamine, tri-n-propylamine and tributylamine may particularly be preferred.

The method for emulsifying/dispersing an isocyanate group-terminated neutralized prepolymer having an anionic group in water may not be particularly limited. Specific examples thereof may include: a method using an emulsification/dispersion device such as homomixer, homogenizer, and disper. At the time of emulsifying/dispersing an isocyanate group-terminated neutralized prepolymer having an anionic group in water, the neutralized prepolymer may preferably be emulsified/dispersed in water by self-emulsification at a temperature of 5 to 40° C. by not particularly using an emulsifier, so as to suppress the reaction of an isocyanate group with water, as completely as possible. In the case of using an emulsifier, the performance in terms of the flame retardancy and water spotting may tend to be reduced.

Further, at the time of emulsification/dispersion, a reaction controlling agent such as phosphoric acid, sodium dihydrogenphosphate, disodium hydrogenphosphate, para-toluenesulfonic acid, adipic acid, and benzoyl chloride may be added, as desired.

The chain extension reaction of the isocyanate group-terminated neutralized prepolymer having an anionic group may be performed by adding the (d) polyamine compound having two or more amino groups and/or imino groups to the isocyanate group-terminated neutralized prepolymer having an anionic group, or by adding the isocyanate group-terminated neutralized prepolymer having an anionic group to the (d) polyamine compound having two or more amino groups and/or imino groups. Such a chain extension reaction may preferably be performed at a reaction temperature of 20 to 40° C. and may usually be completed in 30 to 120 minutes.

In the process for producing the polyurethane resin having an anionic group, the emulsification/dispersion and the chain extension reaction may be effected at the same time, or the isocyanate group-terminated neutralized prepolymer having an anionic group may be emulsified/dispersed and then chain-extended, or may be chain-extended and then emulsified/dispersed.

Such an aqueous polyurethane resin may usually be obtained as an emulsified dispersion of the resin and distributed in the market. The aqueous polyurethane resin according to the present invention may preferably be used in a state of being thus emulsified/dispersed in water, and the concentration thereof may not be particularly limited but may preferably be 15 to 60 mass %, because of a tendency that the coating agent according to the present invention may be easily obtained in a uniform state, or in consideration of the performance of the flame-retardant seat material.

Compound (D):

In the flame-retardant coating agent for a vehicle seat according to the present invention, in view of cost and enhancement of flame retardancy by cooling at the time of burning the flame-retardant seat material, (D) a metal hydroxide (hereinafter, simply referred to as Compound (D)) may preferably be used in combination. The Compound (D) may preferably be at least one kind selected from the group consisting of aluminum hydroxide, magnesium hydroxide, and calcium hydroxide. As Compound (D), two or more kinds of compounds may be combined, as desired. Among these, in the light of flame retardancy and supply, aluminum hydroxide and magnesium hydroxide may be preferred, and aluminum hydroxide may be more preferred. In view of the flame retardancy and whitening or powdering of the coating surface, the average particle size of Compound (D) may preferably be 20 μm or less, more preferably 10 μm or less. In addition, in view of flame retardancy, the content of $SiO_2$ in aluminum hydroxide may preferably be 0.02% or less.

In an embodiment of the present invention wherein Compound (D) is contained in addition to Compound (A) and Compound (C), in view of the flame retardancy, texture, powdering, adhesiveness of the flame-retardant film to the seat material, etc., the ratio (A):(D) of Compound (A) to Compound (D) may preferably be, in mass ratio, 1:0.1 to 10, more preferably 1:0.1 to 7, still more preferably 1:0.1 to 5. In addition, in view of, e.g., flame retardancy, texture, powdering, adhesiveness of the flame-retardant film to the seat material, the mixing ratio {(A)+(D)}:(C) of {Compound (A)+Compound (D)}: Compound (C) may preferably be, in mass ratio, 3:7 to 9:1, more preferably 4:6 to 9:1, still more preferably 5:5 to 9:1.

The mixing amount of Compound (D) may not be particularly limited but may preferably be less than 80 mass %, more preferably less than 70 mass %, with respect to the total of Compound (A), Compound (B) and Compound (D).

If the mixing amount of Compound (D) is 80 mass % more with respect to the total of Compound (A), Compound (B) and Compound (D), the flame retardancy, the adhesiveness of the flame-retardant film to the seat material, etc., may tend to be reduced.

(Preferable Quantitative Ratio Among Compounds (A) to (D))

In the embodiment of the flame-retardant coating agent for a vehicle seat according to the present invention containing Compound (B) and/or Compound (D), (A):{(B)+(D)} may preferably be, in mass ratio, 1:0.1 to 15, more preferably 1:0.1 to 10, still more preferably 1:0.1 to 7, yet still more preferably 1:0.1 to 5. Out of this range, it may tend to be difficult to achieve a good balance of performances.

In this embodiment, the mixing ratio {(A)+(B)+(D)}:(C) of the total of Compound (A), Compound (B) and Compound (D) to Compound (C) may preferably be, in mass ratio, 1:9 to 9.5:0.5, more preferably 3:7 to 9:1, still more preferably 4:6 to 9:1, yet still more preferably 5:5 to 9:1. If the total of Compound (A), Compound (B) and Compound (D) is less than 30 mass % in terms of the ratio to the total of the Compound (A), Compound (B), Compound (C) and Compound (D) (i.e., {(A)+(B)+(D)}/{(A)+(B)+(C)+(D)}<0.30), the flame retardancy may tend to be reduced. On the other hand, if this ratio {(A)+(B)+(D)}/{(A)+(B)+(C)+(D)} is >0.9, there may be, for example, a tendency that productization of the coating agent is difficult, a tendency that the texture is hardened or powdering occurs, and a tendency that the adhesiveness of the flame-retardant film to the seat material is reduced to fail in obtaining sufficient cloth strength.

(Solvent)

In the flame-retardant coating agent for a vehicle seat according to the present invention, at the time of mixing of Compound (A) and Compound (C) (as desired, further Compound (B) and/or Compound (D)), water may preferably be used as the solvent. As the water, ion-exchanged water or distilled water may preferably be used.

In the flame-retardant coating agent for a vehicle seat according to the present invention, an organic solvent may also be used in combination as the solvent. The organic solvent may include glycols such as ethylene glycol, diethylene glycol, butyl glycol, and butyl diglycol; alcohols such as methanol, ethanol, and isopropanol; etc. In view of water spotting, cost, hazardous material, fastness, viscosity and bleed-through, the content of the organic solvent may preferably be 10 mass % or less, more preferably 5 mass % or less, most preferably 0 mass %, with respect to water.

(pH Adjusting Agent)

In the flame-retardant coating agent for a vehicle seat according to the present invention, for example, sodium hydroxide, potassium hydroxide, sodium carbonate, sodium bicarbonate, ammonia, hydrochloric acid, sulfuric acid, nitric acid, phosphoric acid, or acetic acid, etc., may be used as the pH adjusting agent.

(Thickener)

In the present invention, in view of adjusting the viscosity and stickiness of the flame-retardant coating agent for a vehicle seat according to the present invention and adjusting the coatability for a vehicle seat material, a thickener may preferably be used.

Specific examples of the thickener may include a natural water-soluble organic polymer such as gum arabic, tragacanth gum, guar gum, locust bean gum, sodium alginate, carrageenan, xanthan gum, and pullulan; a semisynthetic water-soluble organic polymer such as methyl cellulose, ethyl cellulose, hydroxyethyl cellulose, hydroxypropyl cellulose, and carboxymethyl cellulose; a synthetic water-soluble organic polymer such as polyvinyl alcohol, urethane resin, and alkali thickening type acrylic resin; etc.

One of these thickeners may be used alone, or two or more thereof may also be used in combination, as desired.

Among the thickeners as stated above, in view of coatability, xanthan gum, hydroxyethyl cellulose, polyvinyl alcohol, urethane resin, and alkali thickening type acrylic resin may preferably be used.

The urethane resin may include a polyether polyol-based urethane polymer. As the polyether polyol-based urethane polymer, a commercially available product may be used. Specific examples thereof may include: Adekanol UH-420, Adekanol UH-450, Adekanol UH-540, Adekanol UH-752 (all mfd. by ADEKA Corporation), SN Thickener 601, SN Thickener 612, SN Thickener 621N, SN Thickener 623N (all mfd. by San Nopco Limited), Rheolate 244, Rheolate 278, Rheolate 300 (all mfd. by Elementis Japan), and DK Thickener SCT-275 (mfd. by DKS Co. Ltd.), etc.

(Alkali Thickening Type Acrylic Resin)

The alkali thickening type acrylic resin may preferably be a polymerization product of a monomer composition containing at least one monomer selected from the group consisting of a carboxyl group-containing monomer and a (meth)acrylic acid ester monomer.

Among such alkali thickening type acrylic resins, the alkali thickening type acrylic resin may preferably be a resin obtained by emulsion-polymerizing a monomer composition containing at least one monomer selected from the group consisting of a carboxyl group-containing monomer and a (meth)acrylic acid ester monomer, in the presence of a polymerization initiator, a surfactant, a chain transfer agent, a crosslinking agent, etc., as desired.

Specific examples of the carboxyl group-containing monomer as a constituent of the alkali thickening type acrylic resin may include: a monocarboxylic acid-based monomer such as (meth)acrylic acid, crotonic acid, cinnamic acid, and atropic acid; a dicarboxylic acid-based monomer such as itaconic acid, maleic acid, fumaric acid, citraconic acid, and mesaconic acid, and an acid anhydride thereof; and a dicarboxylic acid monoalkyl ester-based monomer. Among these, acrylic acid and methacrylic acid may be preferred, and methacrylic acid may be more preferred.

Specific examples of the (meth)acrylic acid ester monomer may include: a (meth)acrylic acid alkyl ester monomer having an alkyl group with a carbon number of 1 to 22, which may have a phenyl group, and a (meth)acrylic acid alkyl ester monomer having an alkyl group with a carbon number of 1 to 4 may be preferred.

In the alkali thickening type acrylic resin according to the present invention, other than at least one monomer selected from the group consisting of a carboxyl group-containing monomer and a (meth)acrylic acid ester monomer, a monomer copolymerizable therewith may be used as a constituent. Such a copolymerizable monomer may include: a vinyl carboxylate-based monomer, a styrene-based monomer, a hydroxyl group-containing monomer, an amide group-containing monomer, and a cyano group-containing monomer.

Specific examples of the vinyl carboxylate-based monomer may include: a vinyl carboxylate having an alkyl group with a carbon number of 1 to 21 or a phenyl group and may preferably be vinyl acetate or vinyl propionate.

Specific examples of the styrene-based monomer may include styrene, methylstyrene, ethylstyrene, isopropylstyrene, and tert-butylstyrene, with styrene being preferred.

Specific examples of the hydroxyl group-containing monomer may include a hydroxyalkyl (meth)acrylate having a carbon number of 2 to 4, a polyoxyalkylene mono (meth)acrylate having a carbon number of 2 to 8, glycerin mono(meth)acrylate, pentaerythritol mono(meth)acrylate, (meth)acryl alcohol, glycerin mono(meth)allyl ether, etc.

Specific examples of the amide group-containing monomer may include (meth)acrylamide, an N-alkyl (meth)acrylamide having a carbon number of 1 to 4, an N-hydroxyalkyl (meth)acrylamide having a carbon number of 1 to 3, an N-alkoxymethyl (meth)acrylamide having a carbon number of 1 to 4, diacetone (meth)acrylamide, maleic acid amide, a maleic acid imide, etc. The cyano group-containing monomer may include (meth)acrylonitrile, α-chloroacrylonitrile, α-ethylacrylonitrile, etc. In the as stated above, the (meth)acryl may mean both acryl and methacryl.

(Polymerization Initiator)

Specific examples of the polymerization initiator usable at the time of producing an alkali thickening type acrylic resin may include: a radical donor such as hydrogen peroxide, ammonium persulfate, potassium persulfate, a redox-type initiator (hydrogen peroxide-ferrous chloride, ammonium persulfate-acidic sodium sulfite, ascorbic acid (salt), rongalite, etc.), 1,1-di-tert-butylperoxy-2-methylcyclohexane, 2,2-bis(4,4-di-tert-butylperoxycyclohexyl)propane, and a water-soluble azo-based initiator. In addition, a radical may be generated by photopolymerization with an ultraviolet ray, an electron beam, a radiation beam, etc., and in this case, a photosensitizer, etc., may be used.

(Surfactant)

As the surfactant usable at the time of producing the alkali thickening type acrylic resin, at least one of the later-described known nonionic surfactant and anionic surfactant may be used.

(Chain Transfer Agent)

As the chain transfer agent which is usable at the time of producing the alkali thickening type acrylic resin, those which may be used in emulsion polymerization. Specific examples thereof may include: mercaptans such as n-hexylmercaptan, n-octylmercaptan, n-dodecylmercaptan, t-dodecylmercaptan and n-stearylmercaptan, tetraethylthiuranium sulfide, pentaphenylethane, terpinolene, and α-methylstyrene dimer. These chain transfer agents may be used individually or in combination of two or more thereof, as desired. The crosslinking agent usable at the time of producing the alkali thickening type acrylic resin may not be particularly limited, as long as it is a compound having two or more radical-polymerizable double bonds. Specific examples of the crosslinking agent may include: ethylene glycol di(meth)acrylate, propylene glycol di(meth)acrylate, glycerin di(meth)acrylate, glycerin tri(meth)acrylate, diethylene glycol di(meth)acrylate, diallyl phthalate, diallyl maleate, diallyl fumarate, allyl (meth)acrylate, N,N'-methylene bis(meth)acrylate, and divinylbenzene. Such an agent may be used, as desired.

In addition, a pH buffering agent, a chelating agent, etc., may be used at the time of polymerization. Specific examples of the pH buffering agent may include sodium hydrogencarbonate, sodium carbonate, sodium dihydrogenphosphate, sodium phosphate, sodium acetate, and potassium acetate. Specific examples of the chelating agent may include sodium ethylenediaminetetraacetate and sodium nitrilotriacetate.

As to the alkali thickening type acrylic resin, a commercially available product may be used, and examples thereof may include the followings:

Nikasol VT-253A (mfd. by Nippon Carbide Industries Co., Inc.), ARON A-20P, ARON A-7150, ARON A-7070, ARON B-300, ARON B-300K, ARON B-500, ARON A-20L (all mfd. by Toagosei Co., Ltd.), JURYMER AC-10LHP, JURYMER AC-10SHP, RHEOGIC 250H, RHEOGIC 835H, JUNLON PW-110, JUNLON PW-150 (all mfd. by Nihon Junyaku Co., Ltd.), PRIMAL ASE-60, PRIMAL TT-615, PRIMAL RM-5 (all mfd. by Rohm and Haas Company), SN Thickener A-818, SN Thickener A-850, SN Thickener 902 (all mfd. by San Nopco Limited), Rheolate 430 (mfd. by Elementis Japan), OSTECKER V-500 (mfd. by Nicca Chemical Co., Ltd.), Vanasol K (mfd. by Shin-Nakamura Chemical Co., Ltd.), and VONCOAT HV-E (mfd. by DIC Corporation), etc.

The amount of the thickener used may preferably be 0.1 to 2.0 mass %, more preferably 0.3 to 1.5 mass %, with respect to the flame-retardant coating agent for a vehicle seat.

If the amount used is less than 0.1 mass %, there may be a tendency that storage stability of the flame-retardant coating agent for a vehicle seal is reduced, and a tendency that uniform processing is difficult due to an excessive coating amount or bleed-through. If the amount used exceeds 2.0 mass %, there may be a tendency that the extensibility at the time of coating gets poor, making uniform processing difficult, or a tendency that the effect of reducing water spotting is deteriorated.

In the flame-retardant coating agent for a vehicle seal of the present invention, as long as the effect of the present invention is not impaired, a nitrogen-containing compound, a phosphorus-based compound, a thickener, a thermoplastic resin, a deodorant, a foaming agent, etc., other than those used in the present invention, may be blended.

It may also be possible to use a wax component in combination, as long as the effect of the present invention is not impaired. By using a wax component in combination, smoothness may be imparted to the cloth of sewing needle and the net-weaving thread, and the sewability and ground thread breakage may be improved. In addition, a water-repellent effect may be obtained, and the effect of preventing water spotting may tend to be enhanced. The mixing amount of the wax component may preferably be 0.1 to 3.0 mass % with respect to the flame-retardant coating agent for a vehicle seat.

In the present invention, when a polyurethane resin having a carboxyl group or a carboxylate group is used as Compound (C), as long as the effect of the present invention is not impaired, a crosslinking agent capable of reacting with the carboxyl group or carboxylate group may be further added for the purpose of imparting processing suitability to the obtained flame-retardant vehicle seat material. Such a crosslinking agent may include: oxazoline-based crosslinking agents, epoxy-based crosslinking agents, isocyanate-based crosslinking agents, carbodiimide-based crosslinking agents, azilidine-based crosslinking agents, block isocyanate-based crosslinking agents, water-dispersed isocyanate-based crosslinking agents, melamine-based crosslinking agents, etc.

One of these crosslinking agents may be used alone, or two or more thereof may also be used in combination, as desired. Among these crosslinking agents, in view of strength and fastness, the carbodiimide-based crosslinking agent may be preferred. The mixing amount of the crosslinking agent may preferably be 0.5 to 10 mass % with respect to the aqueous polyurethane resin.

The method for obtaining the flame-retardant coating agent for a vehicle seat according to the present invention may not be particularly limited, and a known method may appropriately be used. The order of or the method for blending respective components of (A) and (C) (as desired, further Compound (B) and/or Compound (D)) may appropriately be changed, but usually, there may be used a method where a water-emulsified/dispersed liquid containing Compound (A) and Compound (C) (as desired, Compound (B) and/or Compound (D)) is blended, stirred and mixed and the viscosity, pH, solid content, etc. are adjusted with a water-emulsified/dispersed liquid containing an alkali thickening type acrylic resin, a pH adjusting agent, and a solvent to obtain a flame-retardant coating agent.

(Method for Mixing Compounds (A) and (C))

As to the method for stirring and mixing the mixture of the Compounds (A) and (C) (as desired, further Compound (B) and/or Compound (D)), a conventionally known stirring device or emulsification/dispersion device may be used. The conventionally known stirring device or emulsification/dispersion device may not be particularly limited. Specific examples thereof may include a stirring device or an emulsification/dispersion device, such as propeller, kneader, roller, colloid mill, bead mill, Milder, homogenizer, ultrasonic homogenizer, homomixer, homodisper, nanomixer, Ultimizer, and Starburst. Of these devices, one kind may be used, or two or more kinds may also be used in combination.

As Compound (A), Compound (B) and Compound (D), a water-emulsified/dispersed liquid thereof may also be used.

As to the method for emulsifying/dispersing Compound (A), Compound (B) and Compound (D), a conventionally known stirring device or emulsification/dispersion device similar to the above may be used.

A surfactant may be used at the time of emulsification/dispersion of Compound (A), Compound (B) and Compound (D). By using a surfactant, Compound (A), Compound (B) and Compound (D) may be stably microparticulated and emulsified/dispersed, powdering on the coating surface may be prevented, mixing with a water-emulsified/dispersed liquid containing Compound (C) may be facilitated, and a flame-retardant coating agent may be easily produced.

Such a surfactant may not be particularly limited, and at least one kind of known nonionic surfactant, anionic surfactant and amphoteric surfactant may be used.

Specific examples of the nonionic surfactant may include: alkylene oxide adducts of linear or branched alcohols or alkenols having a carbon number of 8 to 24, alkylene oxide adducts of polycyclic phenols, alkylene oxide adducts of a linear or branched aliphatic amine having a carbon number of 8 to 44, alkylene oxide adducts of a linear or branched fatty acid amide having a carbon number of 8 to 44, alkylene oxide adducts of a linear or branched fatty acid having a carbon number of 8 to 24, a reaction product of a polyhydric alcohol and a linear or branched fatty acid having a carbon number of 8 to 24 with an alkylene oxide, and alkylene oxide adducts of oils and fats. One of these nonionic surfactants may be used alone, or two or more thereof may also be used in combination, as desired.

Specific examples of the anionic surfactant may include: anionic surfactants of a type that is sulfuric acid ester salts, phosphoric acid ester salts, carboxylic acid salts or sulfosuccinic acids of the nonionic surfactant as stated above, sulfonic acid ester salts or phosphoric acid ester salts of a higher alcohol, sulfonation products of oils and fats, alkylbenzenesulfonates, alkylnaphthalenesulfonates, and naphthalenesulfonate formalin condensates. One of these anionic surfactants may be used alone, or two or more thereof may also be used in combination, as desired.

Specific examples of the amphoteric surfactant may include alkylbetaine-type surfactants, amine oxide-type surfactants, glycine-type surfactants, etc. One of these amphoteric surfactants may be used alone, or two or more thereof may also be used in combination, as desired. Among these, in view of being thermally decomposed and less likely to remain on the coating surface and therefore, not reducing the performance in terms of water spotting, an amine oxide-type surfactant may be preferred.

Above all, in view of emulsification dispersibility and stability, the surfactant may preferably be at least one kind selected from the group consisting of: alkylene oxide adducts of linear or branched alcohols having a carbon number of 8 to 24, alkylene oxide adducts of polycyclic phenols, and anionized products thereof.

The polycyclic phenols may preferably be (3 to 8 mol) styrene adducts, (3 to 8 mol) α-methylstyrene adducts, or a (3 to 8 mol) benzyl chloride adducts, of phenol, 4-cumylphenol, 4-phenylphenol, or 2-naphthol.

The alkylene oxide may preferably be an ethylene oxide. The added molar number may preferably be 10 to 50 mol, more preferably 15 to 40 mol, still more preferably 18 to 35 mol.

(Amount of Surfactant)

The amount of the surfactant in the flame-retardant coating agent for a vehicle seat according to the present invention may preferably be 0.1 to 3 mass parts per 100 mass parts of the total of Compound (A), Compound (B), Compound (C) and Compound (D). If the amount is less than 0.1 mass parts, there may be a tendency that the product stability of the flame-retardant coating agent for a vehicle seat is reduced, or a tendency that the flame retardancy of the flame-retardant seat material is reduced. If the amount exceeds 3 mass parts, the flame-retardant seat material may tend to be reduced in the water spotting preventing effect, fastness, and flame retardancy.

The flame-retardant coating agent for a vehicle seat according to the present invention may preferably have an average particle size d(50) of 0.5 to 30 μm and a maximum particle size d(max) of 200 μm or less, more preferably an average particle size d(50) of 0.5 to 20 μm and a maximum particle size d(max) of 100 μm or less.

If the average particle d(50) exceeds 30 μm or the maximum particle size d(max) exceeds 200 μm, there may be a tendency that the product stability of the flame-retardant coating agent for a vehicle seat is reduced, a tendency that the flame retardancy of the flame-retardant seat material is reduced, or a tendency that the component (A) (depending on the case, further the component (B) and/or the component (D)) is powdered on the surface of the flame-retardant vehicle seat material to degrade the appearance.

If the average particle size d(50) is less than 0.5 µm, a lot of time and cost may be required to reduce the particle size, leading to an industrially undesirable tendency.

(Method for Measuring Particle Diameter)

The particle size may be determined by measuring the cumulative volume particle size distribution by means of a laser diffraction/scattering particle size distribution measuring apparatus and defining the particle size at a cumulative volume of 50% (median particle size) as the average particle size d(50) and the particle size at a cumulative volume of 100% (maximum particle size) as the maximum particle size d(max). Here, as the particle size distribution meter, "HORIBA Laser Diffraction Scattering Particle Size Distribution Measuring Apparatus LA-920" may be used.

In the flame-retardant coating agent for a vehicle seat according to the present invention, the pH may preferably be adjusted to a range of 6.0 to 10.0, more preferably 7.0 to 9.0 If the pH is less than 6.0, there may be a tendency toward reduction in the viscosity of the flame-retardant coating agent for a vehicle seat, reduction in the product stability, an excessive coating amount of the flame-retardant coating agent for a vehicle seal with respect to the vehicle seat material, and back-bleeding. If it exceeds 10.0, the uniform coatability may tend to be reduced.

In the flame-retardant coating agent for a vehicle seat according to the present invention, the total of Compound (A), Compound (B), Compound (C) and Compound (D) may preferably be 20 to 60 mass %. If the total is less than 20 mass %, the coating amount with respect to the vehicle seat material may be insufficient, leading to a tendency that the flame retardancy is reduced or a tendency that the drying requires a long time. If the total exceeds 60%, the coating amount may become excessive with little likelihood of further enhancing the flame retardancy and moreover, various fastnesses may tend to be reduced.

(Viscosity of Flame-Retardant Coating Agent for Vehicle Seat)

The viscosity of the flame-retardant coating agent for a vehicle seat according to the present invention may preferably be 3,000 to 30,000 mPa·s, still more preferably 8,000 to 20,000 mPa·s. If the viscosity is less than 3,000 mPa·s, back-bleeding may tend to be caused, and if the viscosity exceeds 30,000 mPa·s, coating thinning may tend to be caused.

In the case of foam-coating a vehicle seat material with the flame-retardant coating agent for a vehicle seat according to the present invention, the viscosity of the flame-retardant coating agent for a vehicle seat may more preferably be 500 to 10,000 mPa·s. If the viscosity is less than 500 mPa·s, the product stability of the flame-retardant coating agent for a vehicle seat may tend to be deficient, and if the viscosity exceeds 10,000 mPa·s, there may be a tendency that the foaming is poor and good foam-coating may not be conducted.

In the case of performing foam-coating, a foaming agent such as N,N-dimethyldodecylamine oxide or sodium dodecyldiphenyletherdisulfonate may appropriately be used in combination.

The viscosity (unit: mPa·s) of the flame-retardant coating agent for a vehicle seat according to the present invention may be a value obtained by putting 200 ml of the flame-retardant coating agent for a vehicle seat in a vial with an inner diameter of 50 mm and measuring the viscosity by means of a B-type viscometer (high viscosity type, Tokimec Inc., BH-type viscometer, Rotor No. 5, 20 rpm, measurement temperature: 20° C.)

In the flame-retardant coating agent for a vehicle seat according to the present invention, not only the viscosity but also the stickiness may be set to a specific range, whereby good coatability may be obtained. The stickiness may be determined by measuring the PVI value.

In the flame-retardant coating agent for a vehicle seat according to the present invention, the PVI value may preferably be 0.1 to 0.35, more preferably 0.15 to 0.30, still more preferably 0.15 to 0.25. If the PVI value is less than 0.10, there may be a tendency toward coating thinning or incapability of giving a sufficient coating amount, and if it exceeds 0.35, an excessive coating amount or back-bleeding may tend to be caused.

The PVI value refers to a printing viscosity index and be a value calculated by the following formula by measuring the flame-retardant coating agent for a vehicle seat under the viscosity measurement conditions as stated above at a rotational speed of 20 rpm and at 2 rpm.

PVI Value=(measured value at rotational speed of 20 rpm)÷(measured value at rotational speed of 2 rpm)

In the flame-retardant coating agent for a vehicle seat according to the present invention, in view of reducing water spotting, the nonvolatile matter of the flame-retardant coating agent for a vehicle seat according to the present invention, which may be obtained by heating the flame-retardant coating agent for a vehicle seat according to the present invention at 105° C. for 3 hours, may preferably be water-insoluble. The water-insoluble refers to that when the nonvolatile matter of the flame-retardant coating agent for a vehicle seat according to the present invention is powderized in the case of a solid and 10 g of the nonvolatile matter of the flame-retardant coating agent for a vehicle seat according to the present invention is then put in 100 g of ion-exchanged water at 20° C. and strongly shaken at 20° C.±0.5° C. for 1 minute, the degree (g) to which the nonvolatile matter of the flame-retardant coating agent for a vehicle seat according to the present invention dissolves in 100 g of ion-exchanged water is 1.0 g or less. The "dissolve" as used herein may mean to give a transparent solution or be transparently mixed in an arbitrary ratio.

(Process for Producing Flame-Retardant Vehicle Seat Material)

The process for producing a flame-retardant vehicle seat material according to the present invention may not be particularly limited. As the preferable producing method, there may be used, for example, a method of treating one surface of a vehicle seat material with the flame-retardant coating agent for a vehicle seat according to the present invention and then drying it to form a flame-retardant film containing Compound (A) and Compound (C) (as desired, Compound (B) and/or Compound (D)) on the treated surface of the vehicle seat material and/or in the vehicle seat material.

(Treatment of Vehicle Seat Material)

In the case of treating the vehicle seat material with the flame-retardant coating agent for a vehicle seat according to the present invention, the flame-retardant coating agent for a vehicle seat according to the present invention may be used as it is or may appropriately be diluted.

The method for treating the vehicle seat material with the flame-retardant coating agent for a vehicle seat according to the present invention may include: a coating method such as gravure coater, knife coater, roll coater, slit coater, comma coater, air knife coater, flow coater, brush, and foaming.

In the flame-retardant seat material for a vehicle seat according to the present invention, after treating the vehicle seat material with the flame-retardant coating agent for a vehicle seat, lamination or bonding may also be performed.

The method for drying after the treatment of one surface of a vehicle seat material with the flame-retardant coating agent for a vehicle seat according to the present invention may not be particularly limited, and, for example, dry drying using hot air; wet drying using a high-temperature steamer (H.T.S.) or a high-pressure steamer (H.P.S.); and a drier of microwave irradiation type, may be used. One of these drying methods may be used alone, or two or more thereof may also be used in combination, as desired. The drying temperature may preferably be 80 to 180° C. and the drying time may preferably be 1 to 30 minutes. In particular, the drying temperature may preferably be 100 to 160° C. and the drying time may preferably be 1 to 10 minutes. By such drying, a flame-retardant film may be formed on the treated surface of the vehicle seat material and/or in the vehicle seat material.

As for the deposition amount (DRY) of the flame-retardant coating agent for a vehicle seat with respect to the vehicle seat material, the total of Compound (A), Compound (B), Compound (C) and Compound (D) may preferably be 20 to 100 g/m$^2$, more preferably 40 to 80 g/m$^2$.

If the deposition amount (DRY) is less than 20 g/m$^2$, the flame retardancy may tend to be reduced, and if it exceeds 100 g/m$^2$, further improvement of the flame retardancy may tend to be lessened.

The vehicle seat material that may be treated with the flame-retardant coating agent for a vehicle seat according to the present invention may not be particularly limited. Specific examples thereof may include: a woven fabric, a knitted fabric and a nonwoven fabric, each composed of a natural fiber such as cotton, hemp, hemp, silk and wool, a regenerated fiber such as rayon, a semisynthetic fiber such as acetate, a synthetic fiber such as polyamide-based fiber, polyvinyl chloride-based fiber, polyacrylonitrile-based fiber, polyester-based fiber, polyurethane-based fiber, polyethylene-based fiber and polypropylene-based fiber, or a composite or mixed fiber thereof. Among others, in view of the flame retardancy and the effect of reducing water spotting, a woven or nonwoven fabric having a basis weight of 50 g/m$^2$ or more may be preferred, and a woven fabric of 100 to 400 g/m$^2$ and a nonwoven fabric of 50 to 200 g/m$^2$ may be more preferred.

The vehicle seat material may be a material subjected to a dyeing treatment or a soaping treatment.

(Quantitative Ratio)

In the present invention, a quantitative ratio in the following range may be preferred.

In the Compounds (A), (B), (C) and (D), (A):(C) may preferably be 1:9 to 9.5:0.5, more preferably 3:7 to 9:1.

(A)+(B)+(D):(C) may preferably be 1:9 to 9.5:0.5, more preferably 3:7 to 9:1.

(A):(B)+(D) may preferably be 1:0.1 to 15, more preferably 1:0.1 to 10.

(A):(B) may preferably be 1:0.1 to 10, more preferably 1:0.1 to 7.

(A):(D) may preferably be 1:0.1 to 10, more preferably 1:0.1 to 7.

(A)+(B):(C) may preferably be 3:7 to 9:1, more preferably 4:6 to 9:1.

(A)+(D):(C) may preferably be 3:7 to 9:1, more preferably 4:6 to 9:1.

EXAMPLES

Hereinbelow, the present invention will be described in more detail with reference to Examples and Comparative Examples. However, the present invention should not be limited to the following Examples.

Production Example 1

45 mass parts of resorcinol di-2,6-xylenyl phosphate, 5 mass parts of an ethylene oxide 20-mol adduct of tristyrenated phenol (hereinafter, simply referred to as "TSP20E"), and 50 mass parts water were subjected to a bead mill treatment, so as to obtain an emulsified/dispersed liquid (average particle size: 0.5 μm) of Compound (B). In the bead mill treatment, DYNO-MILL MULTI LAB Type (mechanical seal type) of Willy et Bakkofen Inc., Ltd. was used.

Production Example 2

45 Mass parts of 10-benzyl-9,10-dihydro-9-oxa-10-phosphaphenanthrene-10-oxide, 3 mass parts of a sodium hydroxide neutralization product of TSP20E reacted with chlorosulfonic acid (hereinafter, simply referred to as "TSP20ES), and 52 mass parts of water were subjected to a bead mill treatment to obtain an emulsified/dispersed liquid (average particle size: 0.5 μm) of Compound (B).

Production Example 3

An emulsified/dispersed liquid (average particle size: 0.3 μm) of Compound (B) was obtained by performing the operation in the same manner as in Production Example 1 except that biphenyl diphenyl phosphate was used in place of resorcinol di-2,6-xylenylphosphate and a disper treatment was performed in place of the bead mill treatment.

Production Example 4

An emulsified/dispersed liquid (average particle size: 0.3 μm) of Compound (B) was obtained by performing the operation in the same manner as in Production Example 3 except that trixylenyl phosphate was used in place of biphenyl diphenyl phosphate.

Synthesis Example 1

(Polycarbonate-Based Urethane Resin: Polyurethane Resin Having Anionic Group)

In a four-neck flask equipped with a stirrer, a reflux condenser tube, a thermometer and a nitrogen blowing tube, 97.5 g of polyhexamethylene carbonate diol (average molecular weight: 2,000), 7.2 g of dimethylolbutanoic acid, 1.5 g of 1,4-butanediol, 0.005 g of dibutyltin dilaurate, and 61.0 g of methyl ethyl ketone were placed and uniformly mixed, and 36.1 g of isophorone diisocyanate was then added and reacted at 80° C. for 180 minutes to obtain a methyl ethyl ketone solution of a urethane prepolymer having a free isocyanate group content of 2.9% with respect to the nonvolatile matter content. This solution was neutralized with 4.8 g of triethylamine, transferred to another vessel, emulsified/dispersed using a disper blade while gradually adding 362 g of water at 30° C. or less, and after adding 14.5 g of an aqueous 20 mass % ethylenediamine solution, reacted for 90 minutes. Subsequently, the solvent was removed from the obtained polyurethane resin dispersed liquid state at 50° C. under reduced pressure to obtain a polyurethane resin water-emulsified/dispersed liquid wherein the nonvolatile matter content of the polyurethane resin was 30 mass %.

Synthesis Example 2

(Polycarbonate-Based Urethane Resin: Nonionic Forced Emulsification Type)

In the same flask as used in Synthesis Example 1, 195 g of polyhexamethylene carbonate diol (average molecular weight: 2,000), 1.5 g of 1,4-butanediol, 0.005 g of dibutyltin dilaurate, and 61.0 g of methyl ethyl ketone were placed and uniformly mixed, and 36.1 g of isophorone diisocyanate was then added and reacted at 80° C. for 60 minutes to obtain a methyl ethyl ketone solution of a urethane prepolymer having a free isocyanate group content of 1.8% with respect to the nonvolatile matter content. This solution was transferred to another vessel, and 19.6 g of TSP20E was charged thereinto at 30° C. or less. The resulting mixture was made uniform, then emulsified/dispersed using a disper blade while gradually adding 501 g of water at 30° C. or less, and after adding 14.5 g of an aqueous 20 mass % ethylenediamine solution, reacted for 90 minutes. Subsequently, the solvent was removed from the obtained polyurethane resin dispersed liquid state at 50° C. under reduced pressure to obtain a polyurethane resin water-emulsified/dispersed liquid having a nonvolatile matter content of 32.5 mass % (the nonvolatile matter content of the polyurethane resin was 30 mass %).

Example 1

120 Mass parts of melamine cyanurate (trade name: MC-6000, average particle size: 2 μm, mfd. by Nissan Chemical Industries, Ltd.) as the component (A), 266.7 mass parts (120 mass parts as the resorcinol di-2,6-xylenyl phosphate) of the emulsified dispersion of Production Example 1 as the component (B), 200 mass parts (60 mass parts as the polyurethane resin) of the polycarbonate-based urethane resin water-emulsified/dispersed liquid obtained in Synthesis Example 1 as the component (C), 17.5 mass parts (7 mass parts as the alkali thickening type acrylic resin) of NEOSTECKER V-500 (mfd. by Nicca Chemical Co., Ltd.) as the thickener were put in a mixing pot and mixed while stirring to provide a uniform mixture, and the mixture was adjusted by adding water and 25% aqueous ammonia so that the total of the Compounds (A) to (D) in the flame-retardant coating agent for a vehicle seat may be 30 mass % and the pH may be 8.5, to obtain a flame-retardant coating agent for a vehicle seat. In this flame-retardant coating agent for a vehicle seat, the average particle size was 2 μm, the viscosity was 10,000 mPa·s, and the PVI value was 0.2.

Subsequently, one surface of a polyester plain-woven fabric (subjected to dying and soaping) having a basis weight of 250 g/m² was treated with the coating agent as stated above by using a knife coater to provide a deposition amount (DRY) of 50±5 g/m² and dried at 150° C. for 3 minutes to manufacture a flame-retardant vehicle seat material. The deposition amount was determined by calculation according to a formula of: {(mass of flame-retardant vehicle seat material–mass of vehicle seat material)}÷(area of cloth).

The obtained flame-retardant vehicle seat material was evaluated for the fire retardancy (flame retardancy), hot water spotting resistance, and seam fatigue-preventing property, and the results are shown in Table 1.

Examples 2 to 22 and 24 and Comparative Example 1, 3 and 4

Flame-retardant coating agents for a vehicle seat were obtained by performing the operation in the same manner as in Example 1 except for changing the component (A), the component (B), the component (C) and Compound (D) to those in the composition shown in Table 1 and making adjustment so that the total of the Compounds (A) to (D) in the flame-retardant coating agent for a vehicle seat may be 30 mass % and the pH may be 8.5. In all flame-retardant coating agents for a vehicle seat, the viscosity was 10,000 mPa·s, and the PVI value was 0.2. The average particle size is shown in Tables 1 and 2.

Subsequently, flame-retardant vehicle seat materials of Examples 2 to 22 and 24 and Comparative Examples 1, 3 and 4 were obtained by using the obtained coating agents and performing the operation in the same manner as in Example 1.

Example 23

The flame-retardant vehicle seat material of Example 23 was obtained by performing the operation in the same manner as in Example 19 except for not using a thickener.

In the obtained flame-retardant coating agent for a vehicle seat, the viscosity was 300 mPa·s, and the PVA value could not be measured.

These flame-retardant vehicle seat materials were evaluated for the fire retardancy (flame retardancy), hot water spotting resistance, and seam fatigue-preventing property, and the results are shown in Table 2. In Example 23, back-bleeding occurred to reduce the decorative property.

The results from evaluating the fire retardancy, hot water spotting resistance, and seam fatigue-preventing property on these flame-retardant vehicle seat material are shown in Tables 1 and 2.

[Evaluation Method]

1. Measurement Method of Fire Retardancy (Flame Retardancy)

The burn rate was measured on 10 sheets in conformity with FMVSS-302 (Federal Motor Vehicle Safety Standard). The average value (arithmetic mean value) of burn rates of 10 sheets was judged according to the following criteria.

A: The average value of burn rates may be smaller than 50 mm/min, or the burn distance may be 50 mm or less and the time of burning may be within 60 seconds.

In the case of self-extinguishing before benchmark, the burn rate cannot be measured, and the number of occurrences may be indicated on the right of mark A.

B: The average value of burn rates may be larger than 50 mm/min.

C: The average value of burn rates may be larger than 100 mm/min.

2. Method of Measuring Hot Water Spotting

The flame-retardant vehicle seat material was placed on 10 mm-thick urethane foam with the coating-treated surface down, and 5 ml of boiled distilled water was dropped thereon (on the surface opposite the coating-treated surface of the flame-retardant vehicle seat material). After standing at room temperature for 16 hours, the hot water spotting was judged according to the following criteria.

S: Spotting may be unrecognized, and the color tone in the wetted portion may not be changed.

A: Spotting and change of the color tone in the wetted portion may be slightly recognized.

B: Spotting may be clearly recognized, and the color tone in the wetted portion may be different from that in the non-wetted portion.

C: Powdering may be generated in the spotting.

3. Evaluation Method of Texture

The evaluation conformed to JIS L 1096 Method A (45° Cantilever Method). The texture was judged according to the following criteria.

H: A rating of "hard" may be assigned when 70 mm or more.

S: A rating of "soft" may be assigned when less than 70 mm and 40 mm or more.

SS: A rating of "very soft" may be assigned when less than 40 mm.

4. Slimy Feel

Hot water (90° C.) was dropped in a diameter of 5 mm on the coating-treated surface of the flame-retardant vehicle seat material, and the slimy feel was examined by tactile impression according to the following criteria.

S: No slimy feel, and a water droplet may not penetrate into the coating surface.

A: No slimy feel.

B: Slimy feel may be slightly caused.

C: Strong slimy feel may be caused.

5. Seam Fatigue-Preventing Property

Two sheets of test fabric of 10 cm (longitudinal direction)×10 cm (transverse direction) were sampled from the flame-retardant vehicle seat material. The non-coating-treated surfaces of two test fabric sheets were overlapped and stitched with a sewing machine at a pitch of 5 mm at the position of 1 cm from the end of one side in the longitudinal direction to produce a specimen to be tested in the transverse direction. The specimen was opened, one end of the specimen was fixed to a seam fatigue testing machine (manufactured by Yamaguchi Kagaku Sangyo), a load of 3 kgf was applied to another end, and a seam fatigue test was repeated 2,500 times. Thereafter, in the state of the load being applied, the size of a seam (needle hole) was measured in units of 0.1 mm on 10 holes.

A test was similarly performed also in the longitudinal direction, and the values of 20 holes in the longitudinal and transverse directions were averaged. The preventing property was judged according to the following criteria.

A: The average size of seams (needle holes) may be 1.9 mm or less.

B: The average size of seams (needle holes) may be more than 1.9 mm and 2.2 mm or less.

C: The average size of seams (needle holes) may be more than 2.2 mm.

6. Wet Seam Fatigue-Preventing Property

This preventing property was judged according to the same criteria by performing the same test as in the seam fatigue-preventing property except that the specimen prepared in "5. Seam Fatigue-Preventing Property" as stated above was moisturized by immersing it in 200 ml of ion-exchanged water at 45±5° C. and then squeezed to a pickup of 100%.

7. Viscosity 200 ml of the flame-retardant coating agent for a vehicle seat was put in a vial with an inner diameter of 50 mm and measured by means of a B-type viscometer (high viscosity type, Tokimec Inc., BH-type viscometer, Rotor No. 5, 20 rpm, measurement temperature: 20° C.)

TABLE 1

| | Composition of Flame-Retardant Processing Agent | Example | | | | | | | | |
|---|---|---|---|---|---|---|---|---|---|---|
| | | 1 | 2 | 3 | 4 | 5 | 6 | 7 | 8 | 9 |
| Compound A | Melamine cyanurate | 120 | 85 | 60 | 45 | 38 | 45 | 45 | 34.5 | 67.5 |
| Compound B | Production Example 1 | 120 | 85 | 60 | 45 | 38 | | 45 | 34.5 | |
| | Production Example 2 | | | | | | 45 | | | |
| | Production Example 3 | | | | | | | | | |
| | Production Example 4 | | | | | | | | | |
| | Ammonium polyphosphate: *1 | | | | | | | | | 22.5 |
| Compound C | Synthesis Example 1 | 60 | 130 | 92 | 69 | 58 | 69 | | 90 | 69 |
| | Acrylic resin: *2 | | | | | | | 69 | | |
| Compound D | Aluminum hydroxide: *3 | | | 88 | 140 | 166 | 140 | 140 | 140 | 140 |
| | A:B | 1:1 | 1:1 | 1:1 | 1:1 | 1:1 | 1:1 | 1:1 | 1:1 | 1:0.33 |
| | A + B:C | 8:2 | 5.7:4.3 | 5.7:4.3 | 5.7:4.3 | 5.7:4.3 | 5.7:4.3 | 5.7:4.3 | 4.3:5.7 | 5.7:4.3 |
| | D/A + B + D: *5 | 0 | 0 | 42 | 61 | 69 | 61 | 61 | 67 | 61 |
| | Amount of activator: *6 | 4.4 | 3.1 | 2.2 | 1.7 | 1.4 | 1.0 | 2.7 | 2.1 | 0.0 |
| | Average particle diameter (μm) | 2 | 2 | 7 | 7 | 7 | 7 | 7 | 7 | 18 |
| | Flame retardancy | A9 | A9 | A9 | A7 | A7 | A7 | A2 | A2 | A4 |
| | Hot water spotting | A | S | S | S | S | S | S | S | A |
| | Texture | H | H | H | H | H | H | S | H | H |
| | Slime | S | S | S | S | S | S | S | S | A |
| | Seam fatigue-preventing property | A | A | A | A | B | A | A | A | A |
| | Wet seam fatigue | A | A | A | A | B | A | A | A | A |

| | Composition of Flame-Retardant Processing Agent | Example | | | | | |
|---|---|---|---|---|---|---|---|
| | | 10 | 11 | 12 | 13 | 14 | 15 |
| Compound A | Melamine cyanurate | 52 | 15 | 52 | 45 | 50 | 50 |
| Compound B | Production Example 1 | | | | 22.5 | 15 | 15 |
| | Production Example 2 | | | | 22.5 | 15 | |
| | Production Example 3 | | | | | | |
| | Production Example 4 | | | | | | 15 |
| | Ammonium polyphosphate: *1 | 38 | 75 | 38 | | 10 | 10 |

TABLE 1-continued

|  |  |  |  |  |  |  |  |
|---|---|---|---|---|---|---|---|
| Compound C | Synthesis Example 1 | 69 | 69 |  | 69 | 69 | 69 |
|  | Acrylic resin: *2 |  |  | 69 |  |  |  |
| Compound D | Aluminum hydroxide: *3 | 140 | 140 | 140 | 140 | 140 | 140 |
|  | A:B | 1:0.73 | 1:5 | 1:0.73 | 1:1 | 1:0.8 | 1:0.8 |
|  | A + B:C | 5.7:4.3 | 5.7:4.3 | 5.7:4.3 | 5.7:4.3 | 5.7:4.3 | 5.7:4.3 |
|  | D/A + B + D: *5 | 61 | 61 | 61 | 61 | 61 | 61 |
|  | Amount of activator: *6 | 0.0 | 0.0 | 0.0 | 1.4 | 0.9 | 0.9 |
|  | Average particle diameter (μm) | 18 | 18 | 18 | 7 | 18 | 18 |
|  | Flame retardancy | A8 | A8 | A4 | A7 | A8 | A8 |
|  | Hot water spotting | A | B | B | S | S | S |
|  | Texture | H | H | S | H | H | S |
|  | Slime | A | B | B | S | S | S |
|  | Seam fatigue-preventing property | A | A | A | A | A | A |
|  | Wet seam fatigue | A | B | C | A | A | A |

TABLE 2

| Composition of Flame- | | Example | | | | | | |
|---|---|---|---|---|---|---|---|---|
| Retardant Processing Agent | | 16 | 17 | 18 | 19 | 20 | 21 | 22 |
| Compound A | Melamine cyanurate | 81 | 63 | 63 | 78.5 | 118 | 27 | 78.5 |
| Compound B | Production Example 1 | 81 | 63 |  |  |  |  |  |
|  | Production Example 2 |  |  |  |  |  |  |  |
|  | Production Example 3 |  |  | 63 |  |  |  |  |
|  | Production Example 4 |  |  |  | 78.5 | 39 | 130 | 78.5 |
|  | Ammonium polyphosphate: *1 |  |  |  |  |  |  |  |
| Compound C | Synthesis Example 1 | 52 | 39 | 39 | 25 | 25 | 25 |  |
|  | Synthesis Example 2 |  |  |  |  |  |  | 25 |
|  | Acrylic resin: *2 |  |  |  |  |  |  |  |
| Compound D | Aluminum hydroxide: *3 | 86 | 134 | 134 | 118 | 118 | 118 | 118 |
|  | A:B | 1:1 | 1:1 | 1:1 | 1:1 | 1:0.33 | 1:4.8 | 1:1 |
|  | A + B:C | 7.6:2.4 | 7.6:2.4 | 7.6:2.4 | 8.6:1.4 | 8.6:1.4 | 8.6:1.4 | 8.6:1.4 |
|  | D/A + B + D: *5 | 35 | 52 | 52 | 43 | 43 | 43 | 43 |
|  | Amount of activator: *6 | 3.0 | 2.3 | 2.3 | 2.9 | 1.4 | 4.8 | 3.6 |
|  | Average particle diameter (μm) | 7 | 7 | 7 | 7 | 7 | 7 | 7 |
|  | Flame retardancy | A8 | A8 | A7 | A9 | A7 | A7 | A9 |
|  | Hot water spotting | S | S | S | S | S | A | A |
|  | Texture | H | H | SS | SS | S | SS | SS |
|  | Slime | S | S | S | S | S | S | S |
|  | Seam fatigue-preventin property | A | A | A | A | A | A | A |
|  | Wet seam fatigue | A | A | A | A | A | A | A |

| Composition of Flame- | | Comparative | | Comparative Example | | |
|---|---|---|---|---|---|---|
| Retardant Processing Agent | | Example 1 | Example 24 | 3 | 4 | Example 23 |
| Compound A | Melamine cyanurate |  | 171 |  |  | 78.5 |
| Compound B | Production Example 1 | 171 |  |  | 20 |  |
|  | Production Example 2 |  |  | 47 |  |  |
|  | Production Example 3 |  |  |  |  |  |
|  | Production Example 4 |  |  |  |  | 78.5 |
|  | Ammonium polyphosphate: *1 |  |  | 127 | 175 |  |
| Compound C | Synthesis Example 1 | 129 | 129 | 127 |  | 25 |
|  | Synthesis Example 2 |  |  |  |  |  |
|  | Acrylic resin: *2 |  |  |  | 106 |  |
| Compound D | Aluminum hydroxide: *3 |  |  |  |  | 118 |
|  | A:B | 0:1 | 1:0 | 0:1 | 0:1 | 1:1 |
|  | A + B:C | 5.7:4.3 | 5.7:4.3 | 5.8:4.2 | 6.5:3.5 | 8.6:1.4 |
|  | D/A + B + D: *5 | 0 | 0 | 0 | 0 | 43 |
|  | Amount of activator: *6 | 6.3 | 0.0 | 1.0 | 0.7 | 2.9 |
|  | Average particle diameter (μm) | 0.5 | 2 | 18 | 18 | 7 |
|  | Flame retardancy | B | B | A8 | A2 | A9 |
|  | Hot water spotting | A | A | C | C | S |
|  | Texture | H | H | H | S | S |
|  | Slime | S | S | B | C | S |

TABLE 2-continued

|  |  |  |  |  |  |
|---|---|---|---|---|---|
| Seam fatigue-preventin property | A | A | C | C | A |
| Wet seam fatigue | A | A | C | C | A |

*1: Trade name: FRCROS 486, ammonium polyphosphate surface-treated with a silane coupling agent, average particle size: 18 μm, mfd. by Budenheim
*2: Trade name: ARON A-104, mfd. by Toagosei Co., Ltd., the solid content is 40% and therefore, the value of solid content is shown in the Table.
*3: Trade name: B103, average particle size: 7 μm, mfd. by Nippon Light Metal Company, Ltd.
*4: NEOSTECKER V-500 (mfd. by Nicca Chemical Co., Ltd.)
*5: Amount (mass %) of D with respect to the total of A + B + D
*6: Amount (mass parts) of activator per 100 mass parts of the total of A to D

Example 25

340 Mass parts of melamine cyanurate (trade name: MC-6000, average particle size: 2 μm, mfd. by Nissan Chemical Industries, Ltd.) as the component (A), 200 mass parts (60 mass parts as the polyurethane resin) of the polycarbonate-based urethane resin water-emulsified/dispersed liquid obtained in Synthesis Example 1 as the component (C), 17 mass parts (6 mass parts as the alkali thickening type acrylic resin) of NEOSTECKER V-500 (mfd. by Nicca Chemical Co., Ltd.) as the thickener were put in a mixing pot and stirred to provide a uniform mixture, and the mixture was adjusted by adding 25% aqueous ammonia and water so that the total of the Compounds (A) to (D) in the flame-retardant coating agent for a vehicle seat may be 40 mass % and the pH may be 8.5, to obtain a flame-retardant coating agent for a vehicle seat. In this flame-retardant coating agent for a vehicle seat, the average particle size was 2 μm, the viscosity was 10,000 mPa·s, and the PVI value was 0.2.

Subsequently, one surface of a polyester plain-woven fabric (subjected to dying and soaping) having a basis weight of 200 g/m² was treated with the coating agent as stated above by using a knife coater to provide a deposition amount (DRY) of 65±5 g/m² and dried at 150° C. for 3 minutes to manufacture a flame-retardant vehicle seat material. The deposition amount was determined by calculation according to a formula of: {(mass of flame-retardant vehicle seat material−mass of vehicle seat material)}÷(area of cloth).

The obtained flame-retardant vehicle seat material was evaluated for the fire retardancy (flame retardancy), hot water spotting resistance, and seam fatigue-preventing property, and the results are shown in Table 3.

Examples 26 to 35 and Comparative Example 5 to 8

Flame-retardant coating agents for a vehicle seat were obtained by performing the operation in the same manner as in Example 1 except for changing the component (A), the component (B), the component (C) and Compound (D) to those in the composition shown in Table 1 and making adjustment so that the total of the Compounds (A) to (D) in the flame-retardant coating agent for a vehicle seat may be 40 mass % and the pH may be 8.5. In all flame-retardant coating agents for a vehicle seat, the viscosity was 10,000 mPa·s, and the PVI value was 0.2. The average particle size is shown in Tables 3 and 4.

Subsequently, flame-retardant vehicle seat materials of Examples 26 to 35 and Comparative Examples 5 to 8 were obtained by using the obtained coating agents and performing the operation in the same manner as in Example 1.

These flame-retardant vehicle seat materials were evaluated for the fire retardancy (flame retardancy), hot water spotting resistance, and seam fatigue-preventing property, and the results are shown in Tables 3 and 4.

TABLE 3

|  |  | Example | | | | | | | | | | |
|---|---|---|---|---|---|---|---|---|---|---|---|
|  |  | 25 | 26 | 27 | 28 | 29 | 30 | 31 | 32 | 33 | 34 | 35 |
| Compound A | Melamine cyanurate | 340 | 290 | 170 | 68 | 136 | 85 | 228 | 182 | 75 | 56 | 23 |
| Compound B | Production Example 1 |  |  |  | 34 | 85 |  |  |  | 153 | 114 | 205 |
|  | Production Example 2 |  |  |  |  |  |  |  | 46 |  |  |  |
| Compound C | Synthesis Example 1 | 60 | 60 | 60 | 60 | 60 | 60 | 172 | 172 | 172 | 60 | 172 |
| Compound D | Aluminum hydroxide: *3 | 0 | 50 | 170 | 272 | 170 | 170 | 0 | 0 | 0 | 170 | 0 |
|  | A:B + D | 1:0 | 1:0.17 | 1:1 | 1:4 | 1:1.5 | 1:3 | 1:0 | 1:0.25 | 1:2 | 1:5 | 1:9 |
|  | A + B + D:C | 8.5:1.5 | 8.5:1.5 | 8.5:1.5 | 8.5:1.5 | 8.5:1.5 | 8.5:1.5 | 5.7:4.3 | 5.7:4.3 | 5.7:4.3 | 8.5:1.5 | 5.7:4.3 |
|  | D/A + B + D *5 | 0 | 14.7 | 50 | 80 | 50 | 50 | 0 | 0 | 0 | 50 | 0 |
|  | Amount of activator *6 | 0 | 0 | 0 | 0 | 0.9 | 2.4 | 0 | 0.8 | 4.3 | 3.2 | 5.7 |
|  | Average particle diameter (μm) | 2 | 7 | 7 | 7 | 7 | 7 | 2 | 2 | 2 | 7 | 2 |
|  | Flame retardancy | A3 | A5 | A8 | A4 | A8 | A8 | A2 | A8 | A7 | A7 | A3 |
|  | Hot water spotting | A | A | A | A | A | A | A | A | A | A | A |
|  | Texture | H | H | H | H | H | H | H | H | H | H | H |
|  | Slime | S | S | S | S | S | S | S | S | A | A | A |
|  | Seam fatigue-preventing property | A | A | A | A | A | A | A | A | A | A | A |
|  | Wet seam fatigue | A | A | A | A | A | A | A | A | A | A | A |

TABLE 4

|  |  | Comparative Example 5 | Comparative Example 6 | Comparative Example 7 | Comparative Example 8 |
|---|---|---|---|---|---|
| Compound A | Melamine cyanurate | 0 | 0 | 0 | 0 |
| Compound B | Production Example 1 |  |  |  | 228 |
|  | Production Example 2 |  |  | 62 |  |
|  | Production Example 3 |  | 170 |  |  |
|  | Ammonium polyphosphate *1 |  |  | 169 |  |
| Compound C | Synthesis Example 1 | 60 | 60 | 169 | 172 |
| Compound D | Aluminum hydroxide: *3 | 340 | 170 | 0 | 0 |
|  | A:B + D | 0:1 | 0:1 | 0:1 | 0:1 |
|  | A + B + D:C | 8.5:1.5 | 8.5:1.5 | 5.8:4:2 | 5.7:4.3 |
|  | D/A + B + D *5 | 100 | 50 | 0 | 0 |
|  | Amount of activator *6 | 0 | 4.7 | 1.0 | 6.3 |
|  | Average particle diameter (μm) | 7 | 7 | 18 | 0.5 |
|  | Flame retardancy | C | A2 | A8 | B |
|  | Hot water spotting | A | A | C | A |
|  | Texture | H | SS | H | H |
|  | Slime | S | A | B | A |
|  | Seam fatigue-preventing property | A | C | C | A |
|  | Wet seam fatigue | A | C | C | A |

As described in Examples and Comparative Examples as stated above, when a specific nitrogen-containing compound and a specific phosphorus-based compound were used in combination, good results that sufficient flame retardancy (which cannot be achieved by conventional techniques) equal to or greater than that of APP is developed and occurrence of water spotting by hot water is suppressed, were obtained. In addition, it was confirmed that those compounds have no adverse effect on the seam fatigue.

In the flame-retardant coating agent for a vehicle seat according to the present invention, the amount used of a phosphorus-based compound that is expensive in general may be reduced, and the cost may be saved without deteriorating the performance, so that the flame retardancy may also be enhanced by increasing the amount of the compound used. Further, since the amount of the phosphorus-based compound used may be reduced, the wastewater problem due to phosphorus may be alleviated.

In addition, in the present invention, arbitrary texture may be obtained by using the phosphorus-based compound properly.

The quantitative ratios of respective components A to D in each of Examples and Comparative Examples as stated above are shown together in Tables 5 and 6 below.

A:(B+D)
(A+B+D):C
A:C
A:D
(A+D):C

TABLE 5

|  | Example 1 | Example 2 | Example 3 | Example 4 | Example 5 | Example 6 | Example 7 | Example 8 |
|---|---|---|---|---|---|---|---|---|
| A:B + D | 1:1 | 1:1 | 1:2.5 | 1:4.1 | 1:5.4 | 1:4.1 | 1:4.1 | 1:5.1 |
| A + B + D:C | 8:2 | 5.7:4.3 | 6.9:3.1 | 7.7:2.3 | 8.1:1.9 | 7.7:2.3 | 7.7:2.3 | 7:3 |
| A:C | 6.7:3.3 | 4:6 | 4:6 | 4:6 | 4:6 | 4:6 | 4:6 | 2.8:7.2 |
| A:D | 1:0 | 1:0 | 1:1.5 | 1:3.1 | 1:4.4 | 1:3.1 | 1:3.1 | 1:4.1 |
| A + D:C | 6.7:3.3 | 4:6 | 6.2:3.8 | 7.3:2.7 | 7.8:2.2 | 7.3:2.7 | 7.3:2.7 | 6.6:3.4 |

|  | Example 9 | Example 10 | Example 11 | Example 12 | Example 13 | Example 14 | Example 15 |
|---|---|---|---|---|---|---|---|
| A:B + D | 1:2.4 | 1:3.4 | 1:14.3 | 1:3.4 | 1:4.1 | 1:3.6 | 1:3.6 |
| A + B + D:C | 7.7:2.3 | 7.7:2.3 | 7.7:2.3 | 7.7:2.3 | 7.7:2.3 | 7.7:2.3 | 7.7:2.3 |
| A:C | 4.9:5.1 | 4.3:5.7 | 1.7:8.3 | 4.3:5.7 | 4:6 | 4.2:5.8 | 4.2:5.8 |
| A:D | 1:2.1 | 1:2.7 | 1:9.3 | 1:2.7 | 1:3.1 | 1:2.8 | 1:2.8 |
| A + D:C | 7.5:2.5 | 7.4:2.6 | 6.9:3.1 | 7.4:2.6 | 7.3:2.7 | 7.3:2.7 | 7.3:2.7 |

TABLE 6

|  | Example 16 | Example 17 | Example 18 | Example 19 | Example 20 | Example 21 | Example 22 |
|---|---|---|---|---|---|---|---|
| A:B + D | 1:2.1 | 1:3.1 | 1:3.1 | 1:2.5 | 1:1.3 | 1:9.2 | 1:2.5 |
| A + B + D:C | 8.3:1.7 | 8.7:1.3 | 8.7:1.3 | 9.2:0.8 | 9.2:0.8 | 9.2:0.8 | 9.2:0.8 |
| A:C | 6.1:3.9 | 6.2:3.8 | 6.2:3.8 | 7.6:2.4 | 8.3:1.7 | 5.2:4.8 | 7.6:2.4 |
| A:D | 1:1.1 | 1:2.1 | 1:2.1 | 1:1.5 | 1:1 | 1:4.4 | 1:1.5 |

TABLE 6-continued

| | | | | | | |
|---|---|---|---|---|---|---|
| A + D:C | 7.6:2.4 | 8.3:1.7 | 8.3:1.7 | 8.9:1.1 | 9:1 | 8.5:1.5 | 8.9:1.1 |

| | Comparative Example 1 | Example 24 | Comparative Example 3 | Comparative Example 4 | Example 23 |
|---|---|---|---|---|---|
| A:B + D | 0:1 | 1:0 | 0:1 | 0:1 | 1:2.5 |
| A + B + D:C | 5.7:4.3 | 5.7:4.3 | 5.8:4.2 | 6.5:3.5 | 9.2:0.8 |
| A:C | 0:1 | 5.7:4.3 | 0:0 | 0:1 | 7.6:2.4 |
| A:D | 0:0 | 1:0 | 0:0 | 0:0 | 1:1.5 |
| A + D:C | 0:1 | 5.7:4.3 | 0:1 | 0:1 | 8.9:1.1 |

INDUSTRIAL APPLICABILITY

The flame-retardant coating agent for a vehicle seat according to the present invention may be useful, because its use may make it possible to obtain a high-quality flame-retardant vehicle seat material having sufficient fire resistance conformed to "FMVSS-302" speculated by the Federal Motor Vehicle Safety Standard or "JIS D1201" specified in the Japanese Industrial Standards and being prevented from occurrence of water spotting by hot water.

The invention claimed is:

1. A flame-retardant coating agent for a vehicle seat, comprising: (A) a salt of a melamine compound with (iso) cyanuric acid, (B) a phosphorus-based compound which does not contain a nitrogen atom, and (C) an aqueous acrylic resin wherein Compound (B) is at least one selected from the group consisting of the compounds represented by the following formulae (1) to (5):

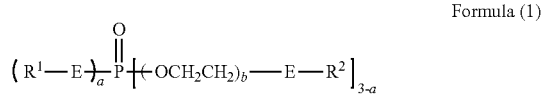

Formula (1)

wherein each of $R^1$ and $R^2$ independently represents a phenyl group that may have an alkyl group having a carbon number of 1 to 4, a naphthyl group that may have an alkyl group having a carbon number of 1 to 4, or a biphenyl group that may have an alkyl group having a carbon number of 1 to 4, E represents a direct bond, —O— or —N(H)—, "a" represents 1 or 2, and b represents 0 or 1, wherein the compound represented by formula (1) is at least one selected from the group consisting of naphthyl diphenyl phosphate, dinaphthyl phenyl phosphate, trinaphthyl phosphate, biphenyl diphenyl phosphate, trixylenyl phosphate, phenoxyethyl diphenyl phosphate, ethylhexyl diphenyl phosphate, tri(isopropylphenyl) phosphate, di(phenoxyethyl)phenyl phosphate, phenoxyethyl dinaphthyl phosphate, di(phenoxyethyl)naphthyl phosphate, naphthoxyethyl diphenyl phosphate, di(naphthoxyethyl) phenyl phosphate, naphthoxyethyl dinaphthyl phosphate, di(naphthoxyethyl)naphthyl phosphate, anilinodiphenyl phosphate, dianilinophenyl phosphate, and trianilinophosphate;

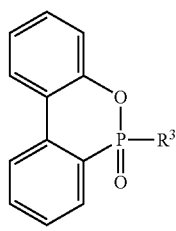

Formula (2)

wherein $R^3$ represents a benzyl group, a methylbenzyl group, a phenethyl group, or a naphthylmethyl group:

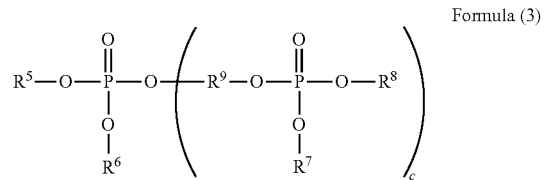

Formula (3)

wherein each of $R^5$ to $R^8$ independently represents a phenyl group that may have an alkyl group having a carbon number of 1 to 4, $R^9$ represents an arylene group that may have a substituent, and c represents an integer of 1 to 5, wherein the compound represented by formula (3) is at least one selected from the group consisting of resorcinol di-2,6-xylenyl phosphate, resorcinol diphenyl phosphate, hydroquinonedi-2,6-xylenyl phosphate, 4,4'-biphenoldi-2,6-xylenyl phosphate, 4,4'-biphenoldiphenyl phosphate, 4,4'-biphenoldicresyl phosphate, biphenol A diphenyl phosphate, and biphenol A dicresyl phosphate;

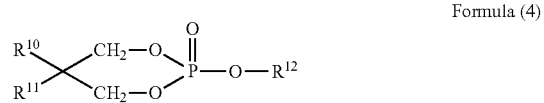

Formula (4)

wherein each of $R^{10}$ and $R^{11}$ independently represents an alkyl group having a carbon number of 1 to 4, and $R^{12}$ represents a biphenyl group or a naphthyl group; and

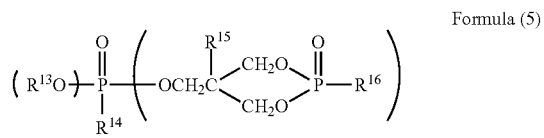

Formula (5)

wherein each of $R^{13}$ to $R^{16}$ independently represents an alkyl group having a carbon number of 1 to 4; and wherein the mixing ratio (A):(B) of Compound (A) to Compound (B) is, in mass ratio, 1:0.1 to 15 and the mixing ratio {(A)+(B)}:(C) of the total of Compound (A) and Compound (B) to Compound (C) is, in mass ratio, 1:9 to 9.5:0.5.

2. A process for producing a flame-retardant vehicle seat material, comprising treating one surface of a vehicle seat material with the flame-retardant coating agent for a vehicle seat according to claim 1 and then drying it to form a flame-retardant film comprising: Compound (A), Compound (B) and Compound (C) on the treated surface of the vehicle seat material and/or in the vehicle seat material, to thereby obtain a flame-retardant vehicle seat material.

* * * * *